United States Patent [19]
Nozaki et al.

[11] Patent Number: 6,111,385
[45] Date of Patent: Aug. 29, 2000

[54] DRIVING METHOD USING MOTOR AND ITS DRIVING APPARATUS, EXCHANGING APPARATUS OF RECORDING MEDIUM, AND DRIVING METHOD OF EXCHANGING APPARATUS OF RECORDING MEDIUM

[75] Inventors: Kenichi Nozaki; Taro Watanabe; Masatsugu Iribe; Junichi Nakamura; Yoshihiro Machiguchi, all of Tokyo, Japan

[73] Assignee: Sony Corporation, Tokyo, Japan

[21] Appl. No.: 09/190,489

[22] Filed: Nov. 12, 1998

[30] Foreign Application Priority Data

Nov. 14, 1997 [JP] Japan .................................. 9-313393
Nov. 14, 1997 [JP] Japan .................................. 9-313394

[51] Int. Cl.[7] ...................................................... H02P 8/00
[52] U.S. Cl. ........................ 318/696; 318/685; 360/98.05
[58] Field of Search ..................................... 318/696, 685, 318/375, 504; 369/178–180; 360/98.01, 98.04, 98.05

[56] References Cited

U.S. PATENT DOCUMENTS

| 4,591,772 | 5/1986 | Hollow | 18/632 |
|---|---|---|---|
| 4,990,837 | 2/1991 | Ishitobi | 318/375 |
| 5,001,410 | 3/1991 | Ono | 318/696 |
| 5,048,063 | 9/1991 | Isobe et al. | 377/17 |
| 5,136,227 | 8/1992 | Nakano et al. | 318/689 |
| 5,875,281 | 2/1999 | Thexton et al. | 388/801 |
| 5,914,918 | 6/1999 | Lee et al. | 369/34 |
| 5,915,861 | 6/1999 | Wegmann et al. | 400/322 |
| 5,946,216 | 8/1999 | Hollerich | 206/307 |

*Primary Examiner*—Brian Sircus
*Attorney, Agent, or Firm*—Jay H. Maioli

[57] ABSTRACT

A driving apparatus using a motor has a stepping motor, a moving mechanism, and a driving circuit. The moving mechanism moves an object to be driven on the basis of a driving force of the stepping motor. The moving mechanism moves the object among a plurality of moving points set on the basis of even-number steps of the stepping motor. The driving circuit supplies a plurality of drive signals equal to a plurality of even-number steps to the stepping motor.

32 Claims, 20 Drawing Sheets

Fig. 4

|  | MOTOR SAMPLE 1 | MOTOR SAMPLE 2 | MOTOR SAMPLE 3 | MOTOR SAMPLE 4 | MOTOR SAMPLE 5 |
|---|---|---|---|---|---|
| CW | 78.5 (avg) | 83.0 (avg) | 81.5 (avg) | 81.0 (avg) | 76.5 (avg) |
| CCW | 83.0 (avg) | 85.5 (avg) | 86.0 (avg) | 83.5 (avg) | 83.5 (avg) |

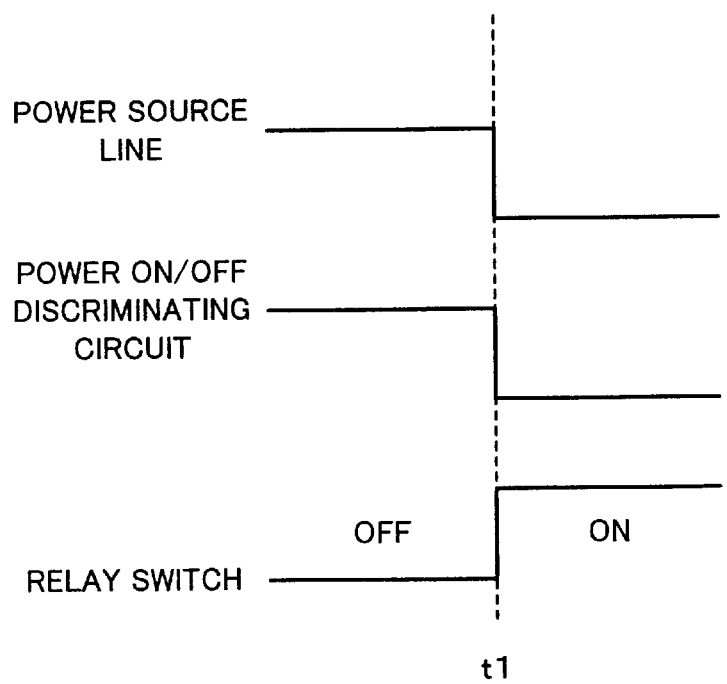

DRIVING METHOD USING MOTOR AND ITS DRIVING APPARATUS, EXCHANGING APPARATUS OF RECORDING MEDIUM, AND DRIVING METHOD OF EXCHANGING APPARATUS OF RECORDING MEDIUM

BACKGROUND OF THE INVENTION

1. Field of the Invention

The invention relates to a driving method using a motor, a driving apparatus using a motor, an exchanging apparatus of a recording medium, and a driving method of an exchanging apparatus of a recording medium.

2. Description of the Related Art

A disk exchanging apparatus such that a plurality of optical disks such as CD-ROMs are enclosed in a disk enclosure and a desired optical disk is taken out from the disk enclosure and is loaded into a disk driving apparatus has been developed.

That is, such a kind of disk exchanging apparatus comprises: the disk enclosure in which a plurality of disks are enclosed; an elevator for conveying the disk from the disk enclosure to the disk driving apparatus or from the disk driving apparatus to the disk enclosure; and the disk driving apparatus. When a desired disk is designated from a plurality of disks, the elevator is moved to a slot in which such a disk is enclosed, and the disk is taken out of the slot. The disk is conveyed to the disk driving apparatus by the elevator and is loaded into the disk driving apparatus.

In case of exchanging the optical disk in the disk driving apparatus, the elevator is moved to the position of the disk driving apparatus and the optical disk is taken out from the disk driving apparatus. The ejected optical disk is conveyed by the elevator to the slot corresponding to the original enclosing position of the disk enclosure and is enclosed into the slot. The elevator is subsequently moved to the slot in which a new optical disk is enclosed, the optical disk is taken out of the slot, and the optical disk is conveyed to the disk driving apparatus and is loaded into the disk driving apparatus.

In such a kind of disk exchanging apparatus, another disk exchanging apparatus such that a plurality of disks are enclosed in the disk enclosure in parallel in the vertical direction, a motor is arranged in the elevator, and the elevator is driven in the vertical direction by a motive power of the motor in the elevator has also been proposed. It is considered to use a stepping motor as a motor to move the elevator.

However, since there is a variation in angle of rotation per step of the stepping motor, it is difficult to control the position of the elevator by the stepping motor at high precision.

That is, if a relation between the rotational angle of the stepping motor and the number of steps is ideal, in such a disk exchanging apparatus, a movement amount of the elevator to the number of steps linearly changes. However, there is a variation in the rotational angle per step of the stepping motor. That is, in the stepping motor, although positioning precision is determined by the number of steps of the motor denoted in a motor body, if there is a variation in dimensions of an internal magnetic circuit, a detent torque (holding power when a coil is open) varies. In case of the magnetic circuit of a multilayer structure, a magnitude of a lead angle appears as a tendency-like difference in the even-number steps and the odd-number steps.

Due to such a variation in rotational angle per step of the stepping motor, the relation between the rotational angle of the stepping motor and the number of steps does not become linear. An error occurs due to such a variation in rotational angle per step and it is difficult to position at high precision.

The angle of rotation of the stepping motor is decided by the number of steps and a driving voltage of the stepping motor is hitherto constant. In the conventional disk exchanging apparatus in which the elevator is vertically moved as mentioned above, the driving voltage is determined so as to generate an enough torque by the operation which needs the maximum operating power during the operation of the elevator. That is, since the maximum torque is needed when the elevator is elevated, the driving voltage is set so that enough torque can be held when the elevator is elevated.

However, if the driving voltage of the stepping motor is set so as to generate an enough torque by the operation when the elevator is elevated, this torque becomes an excessive torque in case of lifting down the elevator. According to the construction such that the elevator is vertically moved as mentioned above, it is necessary to apply a torque of a certain degree to the stepping motor even when the elevator is stopped so as to prevent the elevator from dropping. If the driving voltage of the stepping motor is set so as to generate enough torque by the operation when the elevator is elevated, such a torque becomes an excessive torque even when the elevator is stopped.

As mentioned above, when a plurality of disks are arranged in the vertical direction and the elevator is driven by the stepping motor so as to drive the elevator in the vertical direction, according to the conventional driving circuit in which the driving voltage is constant, there are problems such that a lack of torque occurs when the elevator is elevated, a high speed access cannot be performed, the driving voltage becomes an excessive voltage when the elevator is lifted down or stopped, the motor coil generates a heat, and a damage or a deterioration in operating power occurs.

However, in the foregoing disk exchange apparatus, if a power source is suddenly turned off or a power failure occurs, the power supply to the motor is suddenly stopped. Therefore, when the power supply is stopped, the torque of the motor is extinguished and the elevator drops by a self weight or the like, so that a mechanical portion of the disk exchanging apparatus as well as the elevator is broken or causes a fault.

OBJECTS AND SUMMARY OF THE INVENTION

It is, therefore, an object of the present invention to provide a driving apparatus using a motor, which resolves the above-mentioned problem.

It is another object of the present invention to provide a driving method using a motor, which resolves the above-mentioned problem.

It is further object of the present invention to provide an exchanging apparatus of a recording medium, which resolves the above-mentioned problem.

It is still another object of the present invention to provide a driving method of an exchanging apparatus of a recording medium, which resolves the above-mentioned problem.

According to the present invention, there is provided a driving apparatus using a motor, comprising a stepping motor, a moving mechanism, and a driving circuit. The moving mechanism moves an object to be driven on the basis of a driving force of a stepping motor. The moving mechanism moves the driven object among a plurality of moving points set on the basis of even-number steps of the stepping motor. The driving circuit supplies drive signals of the number as many as the even-number steps to the stepping motor.

According to the present invention, there is provided a driving method using a motor. According to the driving method, distances among a plurality of moving points are set on the basis of even-number steps of a stepping motor, drive signals of the number as many as the even-number steps are supplied to the stepping motor, and an object to be driven is moved on the basis of a driving force of the stepping motor.

According to the present invention, there is provided an exchanging apparatus of a recording medium, comprising an enclosure, a recording and/or a reproducing unit, a conveying mechanism, and a moving mechanism. A plurality of recording media are enclosed in the enclosure. The recording and/or reproducing unit executes a recording and/or a reproduction of the recording medium. The conveying mechanism pulls out the recording medium enclosed in the enclosure from the enclosure and conveys the pulled-out recording medium to the recording and/or reproducing unit. The moving mechanism moves the conveying mechanism between the enclosure and the recording and/or reproducing unit. The moving mechanism has a stepping motor and a driving circuit. On the basis of a driving force of the stepping motor, the moving mechanism moves the conveying mechanism among a plurality of moving points between the enclosure and the recording and/or reproducing unit which were set on the basis of even-number steps of the stepping motor. The driving circuit supplies drive signals of the number as many as the even-number steps to the stepping motor.

According to the present invention, there is provided a driving method of an exchanging apparatus of a recording medium. The exchanging apparatus comprises: an enclosure in which a plurality of recording media are enclosed; a recording and/or reproducing unit for performing a recording and/or a reproduction of the recording medium; a conveying mechanism for pulling out the recording medium enclosed in the enclosure from the enclosure and conveying the pulled-out recording medium to the recording and/or reproducing unit; and a stepping motor for moving the conveying mechanism. According to the driving method, drive signals of the number of even-number steps are supplied to the stepping motor and, on the basis of a driving force of the stepping motor, the conveying mechanism is moved among a plurality of moving points between the enclosure and the recording and/or reproducing unit which were set on the basis of even-number steps of the stepping motor.

According to the present invention, there is provided an exchanging apparatus of a recording medium, comprising an enclosure, a recording and/or reproducing unit, a conveying mechanism, and a moving mechanism. A plurality of recording media are enclosed in the enclosure. The recording and/or reproducing unit performs the recording and/or reproduction of the recording medium. The conveying mechanism pulls out the recording medium enclosed in the enclosure from the enclosure and conveys the pulled-out recording medium to the recording and/or reproducing unit. The moving mechanism moves the conveying mechanism between the enclosure and the recording and/or reproducing unit. The moving mechanism has a stepping motor and a driving circuit. The driving circuit switches a driving voltage of the stepping motor when the conveying mechanism moves between the enclosure and the recording and/or reproducing unit.

According to the present invention, there is provided an exchanging apparatus of a recording medium, comprising an enclosure, a recording and/or reproducing unit, a conveying mechanism, and a moving mechanism. A plurality of recording media are enclosed in the enclosure. The recording and/or reproducing unit performs the recording and/or reproduction of the recording medium. The conveying mechanism pulls out the recording medium enclosed in the enclosure from the enclosure and conveys the pulled-out recording medium to the recording and/or reproducing unit. The moving mechanism moves the conveying mechanism between the enclosure and the recording and/or reproducing unit. The driving circuit short-circuits a portion across a coil of a motor when a power source is shut off.

The above and other objects and features of the present invention will become apparent from the following detailed description and the appended claims with reference to the accompanying drawings.

BRIEF DESCRIPTION OF THE DRAWINGS

FIG. 4 is a schematic diagram showing a variation of a torque of a stepping motor;

FIGS. 24A, 24B, and 24C are timing charts for use in explanation of still another example of the driving circuit of the disk exchanging apparatus to which the invention is applied.

DETAILED DESCRIPTION OF THE PREFERRED EMBODIMENTS

A driving method of a motor and a driving apparatus of the motor according to the invention will now be described in detail hereinbelow with reference to the drawings.

Figure 1:
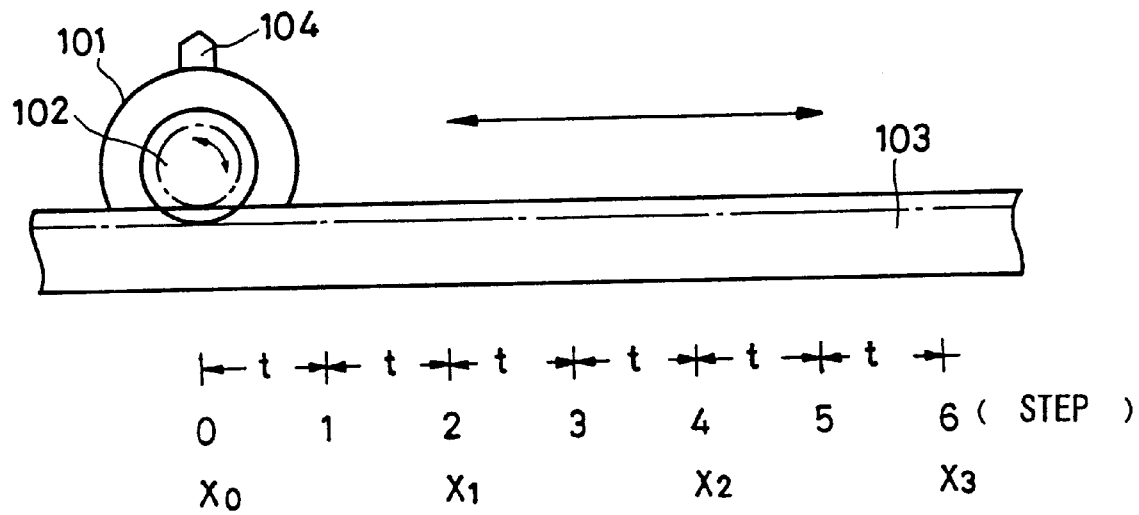
FIG. 1 is a side elevational view showing a model for explaining a principle of the present invention.

For simplicity of explanation, as shown in FIG. 1, consideration will be first made with respect to a model such that a pinion gear 102 is attached to a motor shaft of a stepping motor 101, the pinion gear 102 is in engagement with a rack 103, the stepping motor 101 is rotated, and the whole stepping motor 101 is moved in the horizontal direction on the rack 103. A model such that a driving object 104 is put on the stepping motor 101 and the driving object 104 is moved in the horizontal direction on the rack 103 will now be considered.

An angle of rotation per step of the stepping motor 101 has been predetermined. Therefore, unless there is a variation in rotational angle per step, ideally, the position of the driving object 104 for the number of steps linearly changes in such a model.

Figure 2:
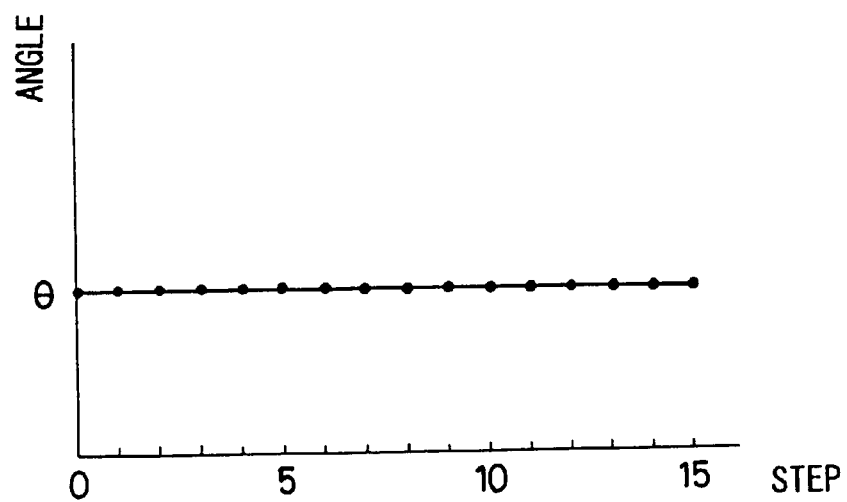
FIG. 2 is a graph for explaining the principle of the invention.

FIG. 2 shows a rotational angle of the stepping motor 101 for each step in an ideal state. As shown in FIG. 2, ideally, the rotational angle of the stepping motor 101 always changes by only an angle θ per step. In this case, now assuming that the driving object 104 in FIG. 1 moves by only a distance t at the rotational angle θ per step, as shown in FIG. 3, a movement distance of the driving object 104 for the number of steps linearly changes.

Figure 3:
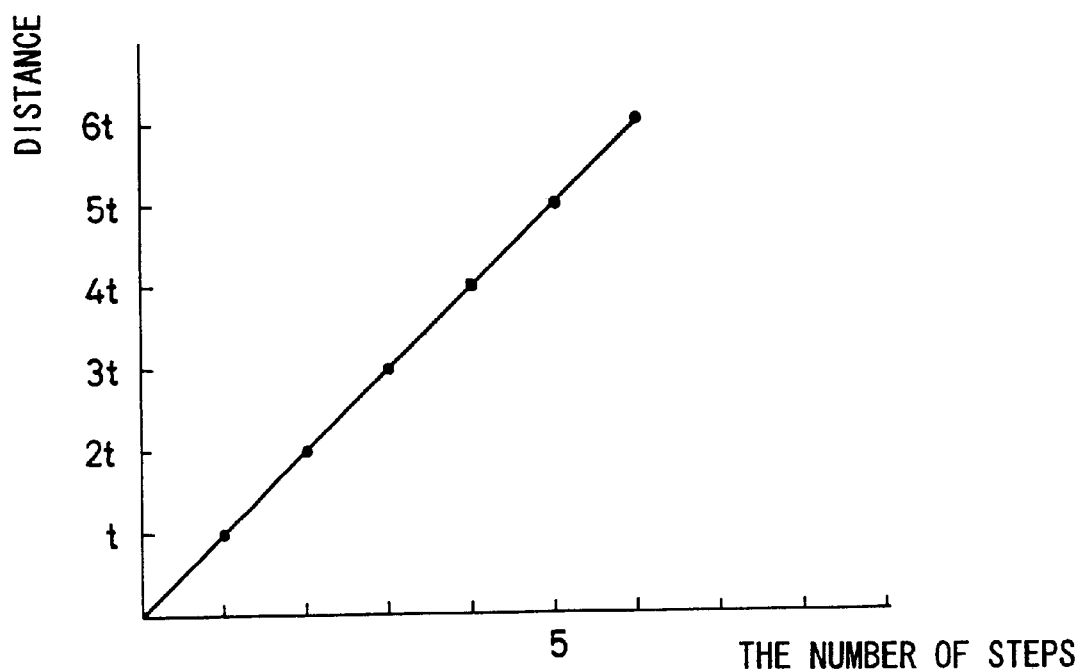
FIG. 3 is a graph for explaining the principle of the invention.

That is, as shown in FIG. 3, the driving object 104 moves by only the distance t in one step, moves by only a distance 2t in two steps, and moves by only a distance 3t in three steps.

As mentioned above, ideally, there is no variation in the rotational angle per step of the stepping motor 101 and, in the model as shown in FIG. 1, the movement distance of the driving object 104 linearly changes for the number of steps. So long as such an ideal state, if pulses of the number as many as the number of steps corresponding to the movement distance are supplied to the stepping motor 101, the driving object 104 can be precisely moved.

However, actually, the stepping motor 101 has a variation of the performance or the like of the motor 101 itself and an ideal state as mentioned above is not derived. That is, FIG. 4 shows a variation in a torque of each product of five motor samples. Reference character CW denotes a clockwise direction and CCW indicates a counterclockwise direction. As shown in FIG. 4, a variation of a detent torque exists for each product. There are not only the variation of every product but also a variation in detent torque when the stepping motor is rotated to the right direction and when it is rotated to the left direction even in case of the same stepping motor.

Figure 5:
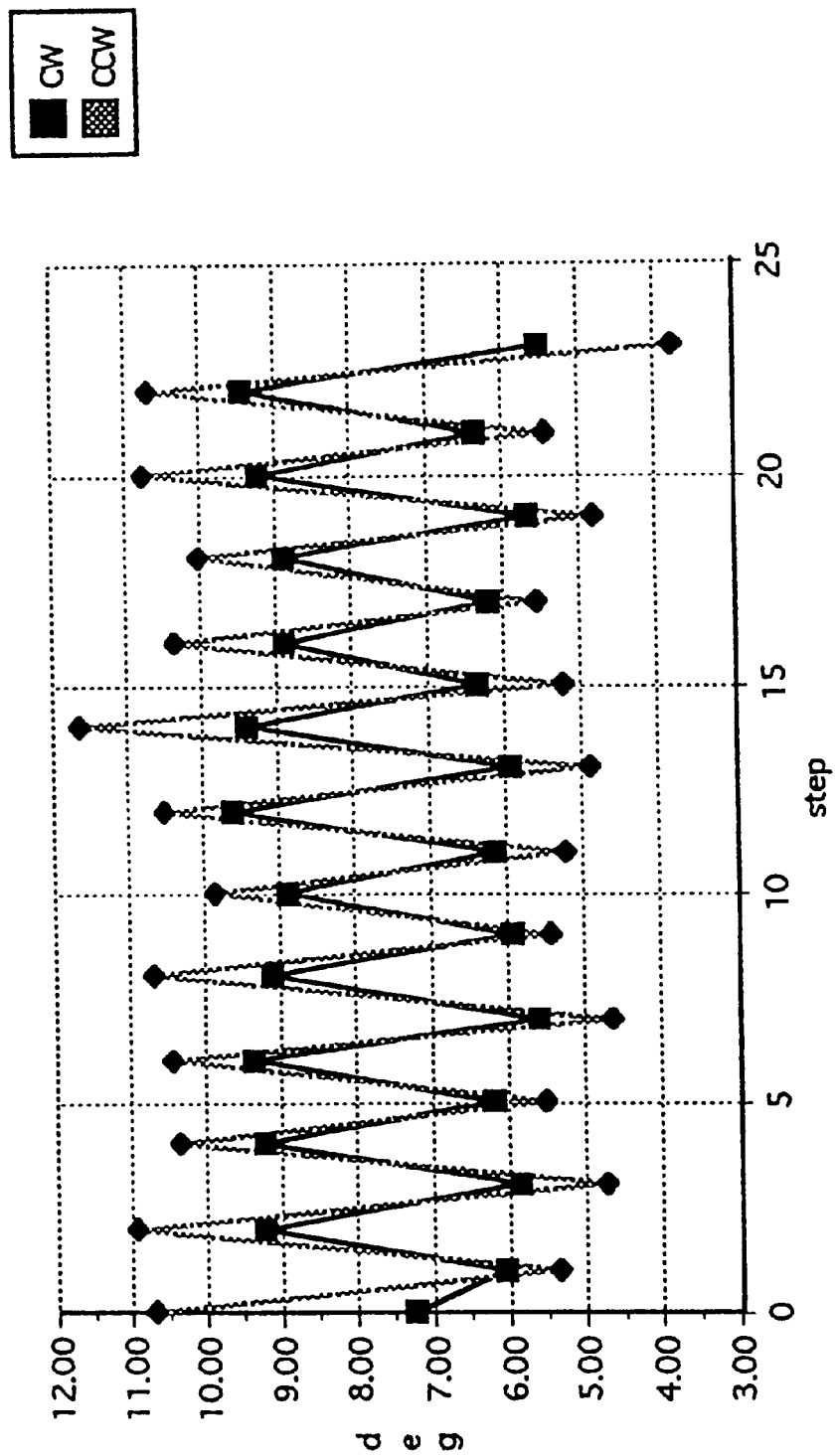
FIG. 5 is a graph showing a variation of an angle of every step of the stepping motor.

When the stepping motor 101 is rotated, a variation in rotational angle for each step occurs. FIG. 5 shows such a variation in the stepping motor 101 of a double structure. In FIG. 5, an axis of abscissa shows the number of steps and an axis of ordinate indicates a lead angle.

As shown in FIG. 5, it is assumed that the stepping motor 101 rotates by 7.5° per step as a design value. However, there is a variation in rotational angle per step of the stepping motor 101 and, actually, the rotational angle per step is not equal to 7.5°. In FIG. 5, a solid line shows characteristics when the stepping motor 101 is rotated clockwise and a broken line shows characteristics when the stepping motor 101 is rotated counterclockwise.

Figure 6:
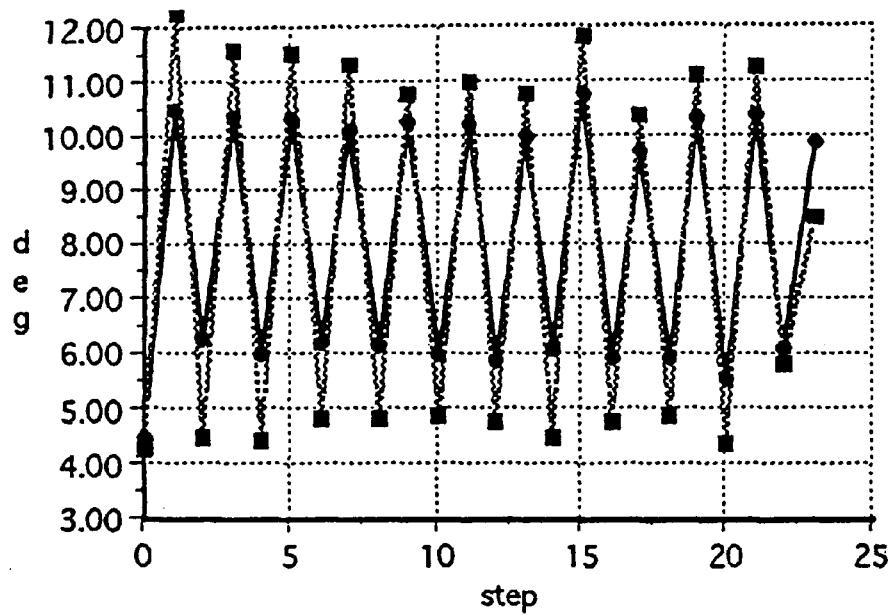
FIG. 6 is a graph showing a variation of the angle of every step of the stepping motor.
Figure 7:
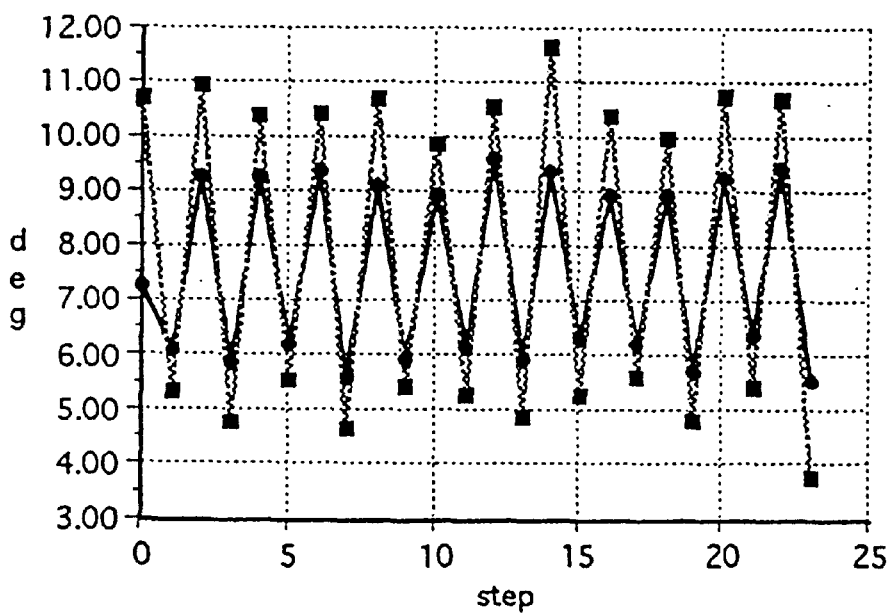
FIG. 7 is a graph showing a variation of the angle of every step of the stepping motor.

A magnitude of the variation in rotational angle of the stepping motor 101 is influenced by a holding voltage of the coil. That is, FIG. 6 shows characteristics when the holding voltage is set to 3V and FIG. 7 shows characteristics when the holding voltage is set to 6V. As will be understood by comparing FIGS. 6 and 7, as shown in FIG. 7, the variation when the holding voltage is equal to 6V is smaller than that when the holding voltage is equal to 3V as shown in FIG. 6. It will be understood from this comparison that by raising the holding voltage, the detent torque is improved and the variation for the set value decreases.

The applicant of the present invention examined with respect to a tendency of the variation of the stepping motor 101 from the characteristics of the variation of the stepping motor 101 as mentioned above. Thus, the following tendency has been found.

That is, although the magnitude of the variation in rotational angle in each step in the case where the stepping motor 101 is rotated clockwise differs from that when it is rotated counterclockwise, their tendencies are similar. When the rotational angle is larger than the design value in a certain step, the rotational angle is smaller than the design value in the next step and a state where the rotational angle is larger than the design value and a state where it is smaller than the design value are repeated every step. A deviation amount from the design value of the rotational angle when the rotational angle is larger than the design value and a deviation amount from the design value of the rotational angle when the rotational angle is smaller than the design value are almost constant.

That is, as shown by a solid line in FIG. 5, when the stepping motor is rotated clockwise, the rotational angle is smaller than 7.5° as a rotational angle of the design value in 1 step, 3 steps, 5 steps, . . . . The rotational angle becomes constant at almost 6°. On the other hand, when the stepping motor is rotated clockwise, the rotational angle is larger than 7.5° as a rotational angle of the design value in 2 steps, 4 steps, 6 steps, . . . . The rotational angle becomes constant at almost 9°.

As mentioned above, the rotational angle for the number of steps when the stepping motor is rotated clockwise is repetitively set to about 6° (7.5°−1.5°) and 9° (7.5°+1.5°) every step.

Similarly, when the stepping motor is rotated counterclockwise, the rotational angle is smaller than 7.5° as a rotational angle of the design value in 1 step, 3 steps, 5 steps, . . . . The rotational angle lies within a range from almost 4.5° to 5.5°. On the other hand, when the stepping motor is rotated counterclockwise, the rotational angle is larger than 7.5° as a rotational angle of the design value in 2 steps, 4 steps, 6 steps, . . . . The rotational angle lies within a range from almost 10° to 11°.

As mentioned above, the stepping motor 101 has characteristics such that the state where the rotational angle is larger than the design value and the state where it is smaller are repeated every step and a deviation amount from the design value of the rotational angle when the rotational angle is larger than the design value and a deviation amount from the design value of the rotational angle when the rotational angle is smaller than the design value are almost constant.

Figure 8:
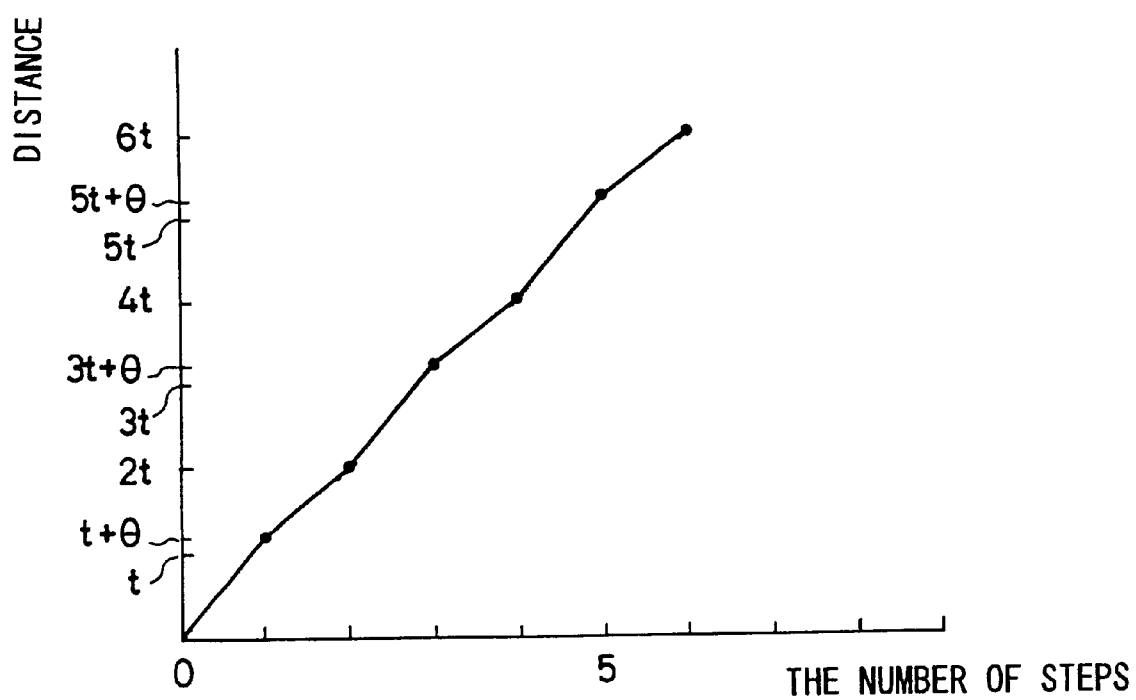
FIG. 8 is a graph for explaining the principle of the invention.

Returning to the model of FIG. 1, the motion of the driving object 104 when the actual stepping motor 101 is rotated will now be examined. Now, assuming that the stepping motor 101 is ideal and the rotational angle per step is constant, the movement distance of the driving object 104 for the number of steps linearly changes as shown in FIG. 3. However, in the actual stepping motor 101, as mentioned above, the state where the rotational angle is larger than the design value and the state where it is smaller are repeated every step. Therefore, the movement distance of the driving object 104 for the number of steps changes in zig-zag manner as shown in FIG. 8.

As mentioned above, in the actual stepping motor 101, the state where the rotational angle is larger than the design value and the state where it is smaller are repeated every step. It is now assumed that the movement amount per step of the stepping motor 101 is equal to θ and a deviation of only ±e from the design value θ every step occurs in the stepping motor 101. It is also assumed that when the stepping motor 101 rotates every step, the driving object 104 moves by only the distance t according to the design value and the movement amount causes a positional deviation of only ±e from the design value t every step due to the variation in rotational angle of the stepping motor 101.

In this case, the movement amount of the driving object 104 in the first step is equal to the sum of the design value t of the movement amount and the error e, namely, (t+e)

The movement amount of the driving object 104 in the second step is equal to the sum of the movement amount (t+e) in the previous step and a movement amount (t−e) in the next step, namely, $(t+e)+(t-e)=2t$ Further, the movement amount of the driving object 104 in the third step is equal to $2t+(t+e)=3t+e$ Further, the movement amount of the driving object 104 in the fourth step is equal to $(3t+e)+(t-e)=4t$ Further, the movement amount of the driving object 104 in the fifth step is equal to $4t+(t+e)=5t+e$ As mentioned above, it will be understood that when the driving object 104 is moved by the stepping motor 101, although the error e remains in case of moving the stepping motor 101 by a distance corresponding to odd-number steps, the error e is cancelled and the error (e) hardly occurs in the case of moving the stepping motor by a distance corresponding to even-number steps. Consequently, by controlling so as to always drive the stepping motor 101 by even-number steps, the high positioning precision is always held.

Nothing is considered, on the other hand, with respect to a target position of the driving object 104 when the driving object 104 is moved by the stepping motor 101. If the target position exists at the position where the stepping motor 101 is driven by odd-number steps, the stepping motor 101 has to be driven by odd-number steps and it is difficult to always drive stepping motor 101 by even-number steps.

The target position of the driving object 104, accordingly, is preset so as to be located at the position when the stepping motor 101 is moved by even-number steps. That is, in FIG. 1, the target position of the driving object 104 is preset to positions $X_0, X_1, X_2, X_3, \ldots$ where the driving object reaches when the stepping motor 101 is moved by even-number steps.

As mentioned above, if the target positions $X_0, X_1, X_2, X_3, \ldots$ of the driving object 104 are set to the positions where the driving object reaches when the stepping motor 101 is moved by even-number steps, the stepping motor 101 is always controlled by even-number steps. If the stepping motor 101 is always driven by even-number steps, the high positioning precision can be always held.

Figure 9:
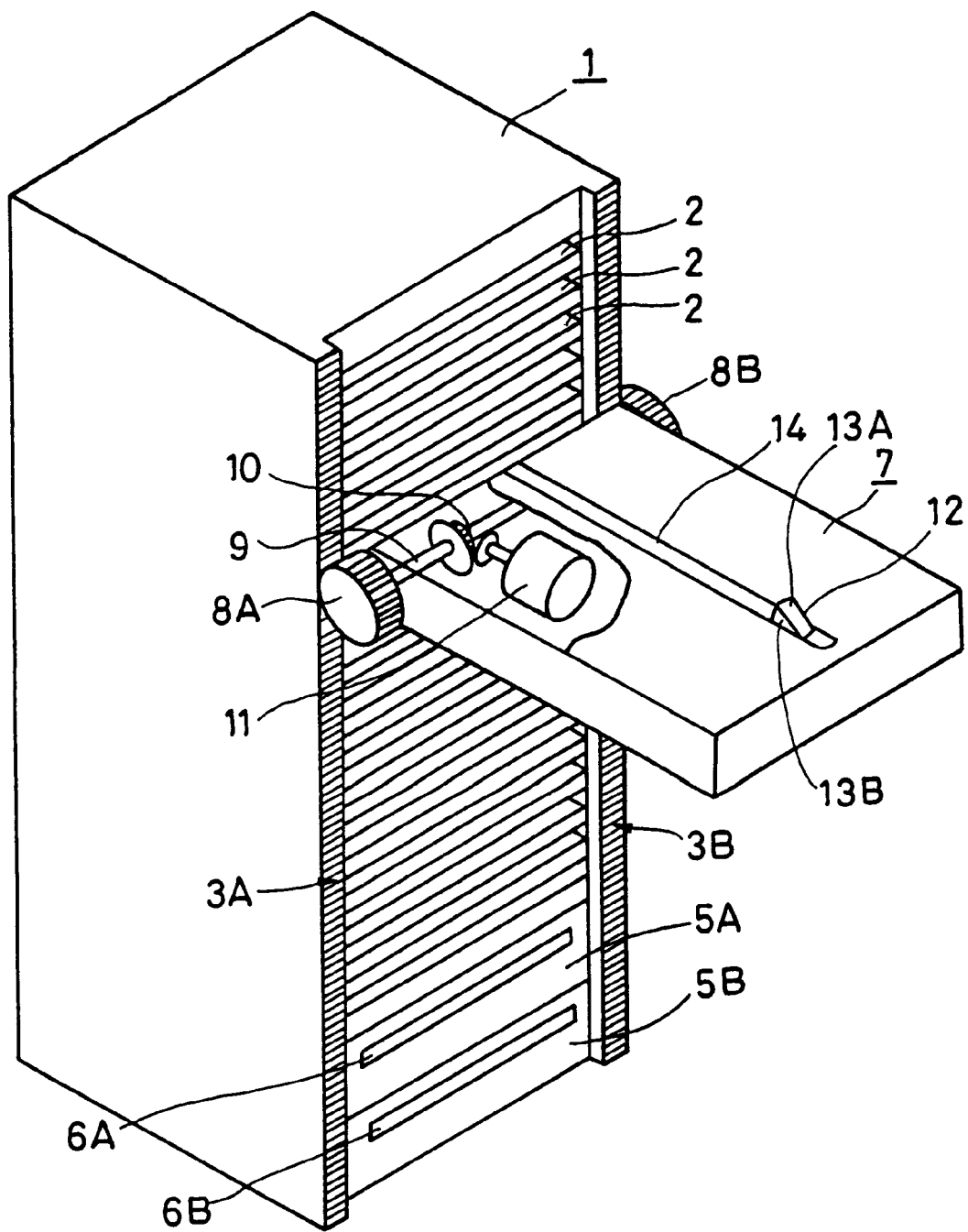
FIG. 9 is a perspective view of an example of a disk exchanging apparatus to which the invention is applied.

The invention is suitable for use in a case of, for example, controlling the position of the elevator of the disk exchanging apparatus. FIG. 9 shows a construction of a disk exchanging apparatus to which the invention can be applied.

In FIG. 9, a plurality of slots 2 are arranged in the front of a disk enclosure 1 in the vertical direction so as to be away from one another by predetermined intervals. A plurality of CD-ROM disks (hereinafter, simply referred to as optical disks) are enclosed in the slots 2 in a state where they face each other in the horizontal direction, namely, in a laminated state.

The optical disk is formed in a manner such that a synthetic resin having light transmittance such as a polycarbonate resin is molded, a disk board having rigidity is formed, and a signal recording layer is formed on the disk board. The optical disk is a disk such that digital information has been recorded on an optical disk similar to what is called a compact disc for music. A diameter of the optical disk is equal to 120 mm and its thickness is equal to 1.2 mm. A capacity in which such an optical disk can be enclosed is assured for each slot 2.

Racks 3A and 3B extending in the vertical direction are provided on both sides of the front side of the disk enclosure 1. As will be explained hereinlater, the racks 3A and 3B are in engagement with gears 8A and 8B of an elevator 7 and are used to move the elevator 7 along the front side of the disk enclosure 1.

Disk driving apparatuses 5A and 5B are provided in a lower end portion of the disk enclosure 1. Each of the disk driving apparatuses 5A and 5B reproduces the optical disk enclosed in the disk enclosure 1 and has a reproducing unit for irradiating a laser beam to the optical disk and reading a recording signal recorded on the optical disk, a servo circuit, a signal processing circuit, and the like.

Opening portions 6A and 6B for loading the disk are provided for the disk driving apparatuses 5A and 5B, respectively. Through the opening portions 6A and 6B for loading the disk, the loading of the optical disks into the disk driving apparatuses 5A and 5B or the unloading of the optical disks from the disk driving apparatuses 5A and 5B is executed.

The elevator 7 is moved in the vertical direction along the front side of the disk enclosure 1 by a guiding mechanism (not shown) and conveys the optical disk taken out from a desired slot 2 of the disk enclosure 1 to the opening portion 6A or 6B of the disk driving apparatus 5A or 5B. The elevator 7 also conveys the optical disk taken out or ejected from the opening portion 6A or 6B of the disk driving apparatus 5A or 5B to the slot 2 serving as an original enclosing position of the disk enclosure 1.

The gears 8A and 8B which are in engagement with the racks 3A and 3B on both sides of the front side of the disk enclosure 1 are provided for the elevator 7. The gears 8A and 8B are attached to a rotary shaft 9 which is pivotally supported to the elevator 7.

For example, a stepping motor 11 of four phases is attached to the elevator 7. A gear mechanism 10 is provided between the stepping motor 11 and the rotary shaft 9. The gear mechanism 10 is a mechanism like a bevel gear or a worm wheel and transfers the rotation of the stepping motor 11 to the rotary shaft 9 arranged in the direction that is almost perpendicularly across the rotary shaft of the stepping motor 11.

When the stepping motor 11 is rotated, the rotation of the stepping motor 11 is transferred to the rotary shaft 9 through the gear mechanism 10. When the rotary shaft 9 is rotated, the gears 8A and 8B rotate. Since the gears 8A and 8B are in engagement with the racks 3A and 3B, when the stepping motor 11 is rotated, the gears 8A and 8B rotate and the elevator 7 is moved up or down along the front side of the disk enclosure 1 by a rack and pinion mechanism while being guided by a guiding mechanism (not shown).

A disk grasping mechanism 12 is provided for the elevator 7. The disk grasping mechanism 12 can move along a guide groove 14 formed on the elevator 7. The disk grasping mechanism 12 comprises two arms 13A and 13B and has a structure such that the optical disk is pulled out of the disk enclosure 1 and is sandwiched by the arms 13A and 13B and is held on the elevator 7.

In case of selecting a desired optical disk from a plurality of optical disks enclosed in the disk enclosure 1 and loading into either one of the disk driving apparatuses 5A and 5B, the elevator 7 is moved to the position of the slot where the desired optical disk has been enclosed. The position control of the elevator 7 is executed by a controller as will be explained hereinafter.

Figure 10:
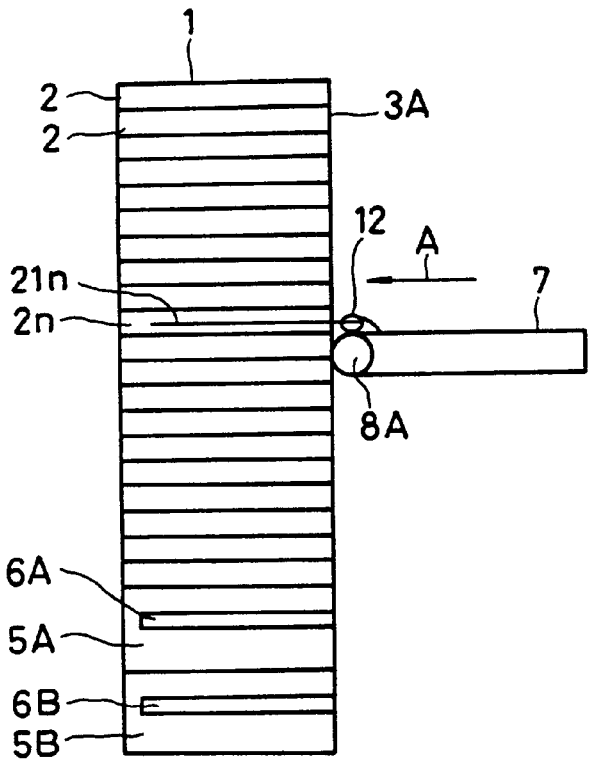
FIG. 10 is a side elevational view for use in explanation of an example of the disk exchanging apparatus to which the invention is applied.

That is, FIGS. 10 to 13 show a state of the motion of the elevator 7 when the disk is conveyed. For instance, in case of loading a disk 21n in a slot 2n into the disk driving apparatus 5A, as shown in FIG. 10, the elevator 7 is moved to the position of the slot 2n. The disk grasping mechanism 12 is moved in the direction shown by an arrow A in FIG. 10 and the optical disk 21n in the disk enclosure 1 is held by the disk grasping mechanism 12.

Figure 11:
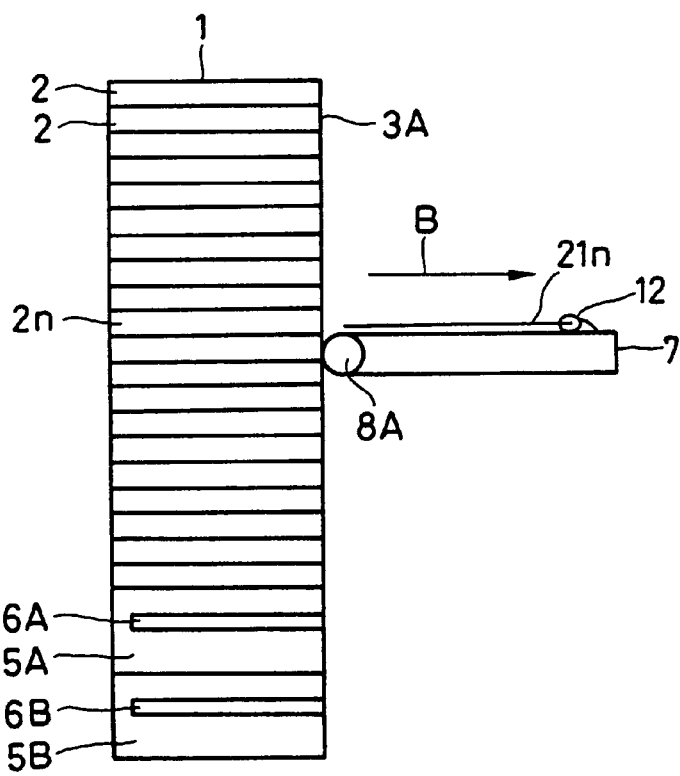
FIG. 11 is a side elevational view for use in explanation of an example of the disk exchanging apparatus to which the invention can be applied.

As shown in FIG. 11, the disk grasping mechanism 12 is moved in the direction of an arrow B in FIG. 11, the optical disk 21n is pulled out of the slot 2n of the disk enclosure 1 by the disk grasping mechanism 12, and the pulled-out disk 21n is put and held on the elevator 7.

Figure 12:
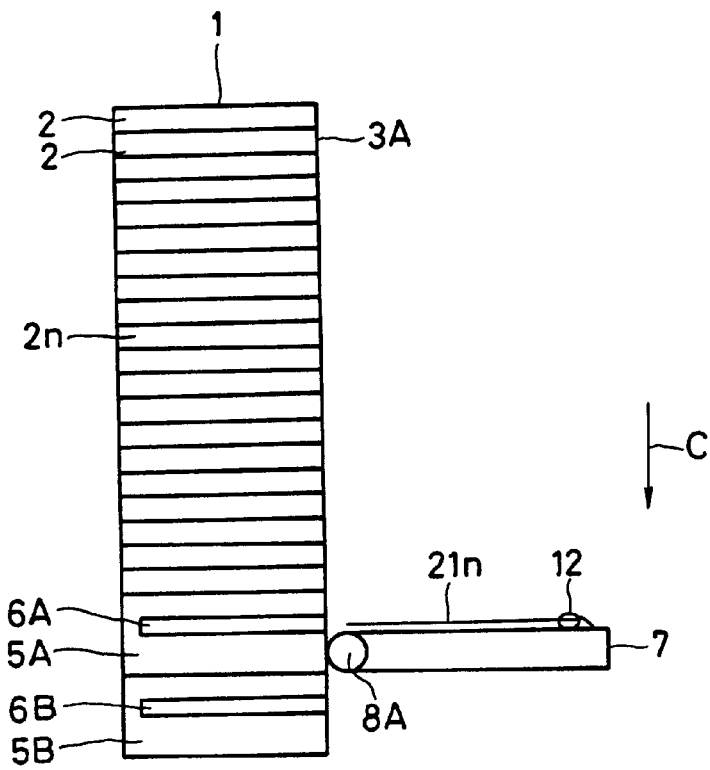
FIG. 12 is a side elevational view for use in explanation of an example of the disk exchanging apparatus to which the invention is applied.

As shown in FIG. 12, the stepping motor 11 is again driven and the elevator 7 is moved in the direction of an arrow C. The stepping motor 11 is driven so that the elevator 7 reaches the position of the opening portion 6A of the disk driving apparatus 5A. The stepping motor 11 is stopped at a time point when the opening portion 6A faces the elevator 7.

Figure 13:
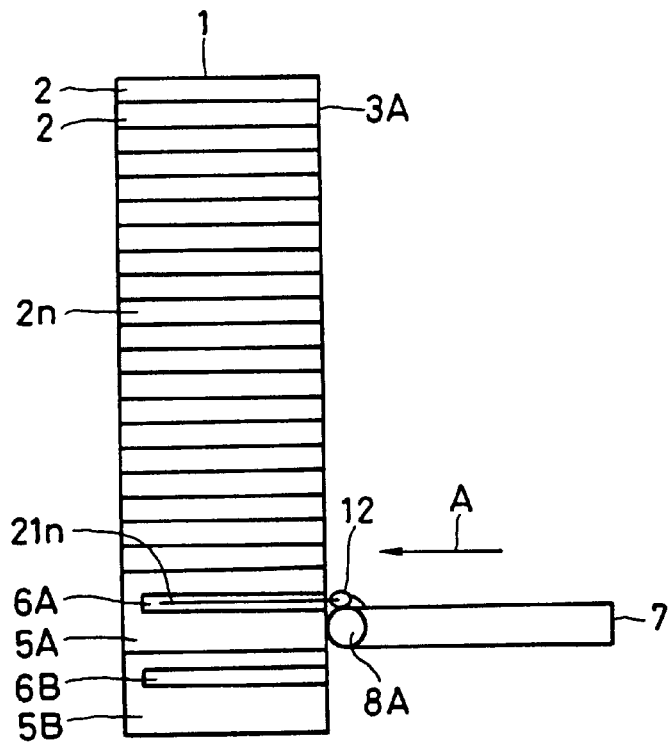
FIG. 13 is a side elevational view for use in explanation of an example of the disk exchanging apparatus to which the invention is applied.

As shown in FIG. 13, the disk grasping mechanism 12 is moved in the direction of the arrow A in FIG. 13. By the disk grasping mechanism 12, the optical disk 21n is inserted into the disk driving apparatus 5A from the opening portion 6A of the disk driving apparatus 5A. The optical disk 21n is pulled into the driving apparatus 5A and is loaded into the reproducing unit by a loading mechanism provided for the driving apparatus 5A.

Figure 14:
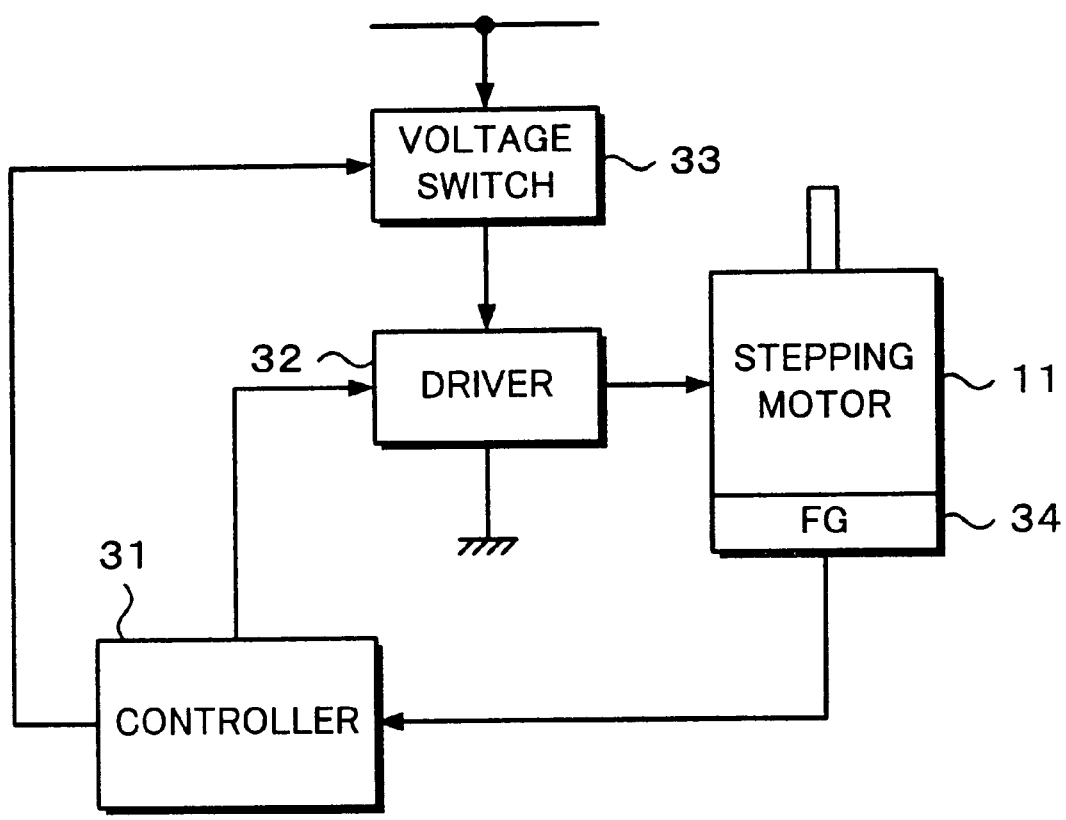
FIG. 14 is a block diagram for use in explanation of an example of a motor driving circuit in the disk exchanging apparatus to which the invention can be applied.

FIG. 14 shows a control circuit of the stepping motor 11. As shown in FIG. 14, the stepping motor 11 is controlled by a controller 31. That is, in FIG. 14, the controller 31 controls the whole operation of the disk exchanging apparatus. In case of moving the elevator 7 upward or downward, a driving command of the elevator 7 is generated from the controller 31 and is supplied to a driving unit 32.

A drive signal of the stepping motor 11 is formed by the driving unit 32 in response to a driving command from the controller 31. The drive signal from the driving unit 32 is supplied to the stepping motor The rotation of the stepping motor 11 is detected by an FG generating circuit 34. The FG generating circuit 34 generates a signal corresponding to the rotational angle of the stepping motor 11. An output of the FG generating circuit 34 is supplied to the controller 31.

When the stepping motor 11 is rotated, the elevator 7 moves. A movement amount of the elevator 7 is detected on the basis of the output from the FG generating circuit 34. The controller 31 discriminates whether the elevator 7 has been moved by a predetermined amount or not on the basis of the output of the FG generating circuit 34. When it is detected that the elevator 7 has been moved by the predetermined amount, the drive signal which is supplied from the controller 31 to the driving unit 32 is stopped.

Even when the elevator 7 is stopped, a driving voltage is applied to the stepping motor 11. Therefore, a torque occurs in the stepping motor 11. So that when the elevator 7 is stopped, the elevator 7 is held at such a stop position. This operation will be described hereinlater.

Figure 15:
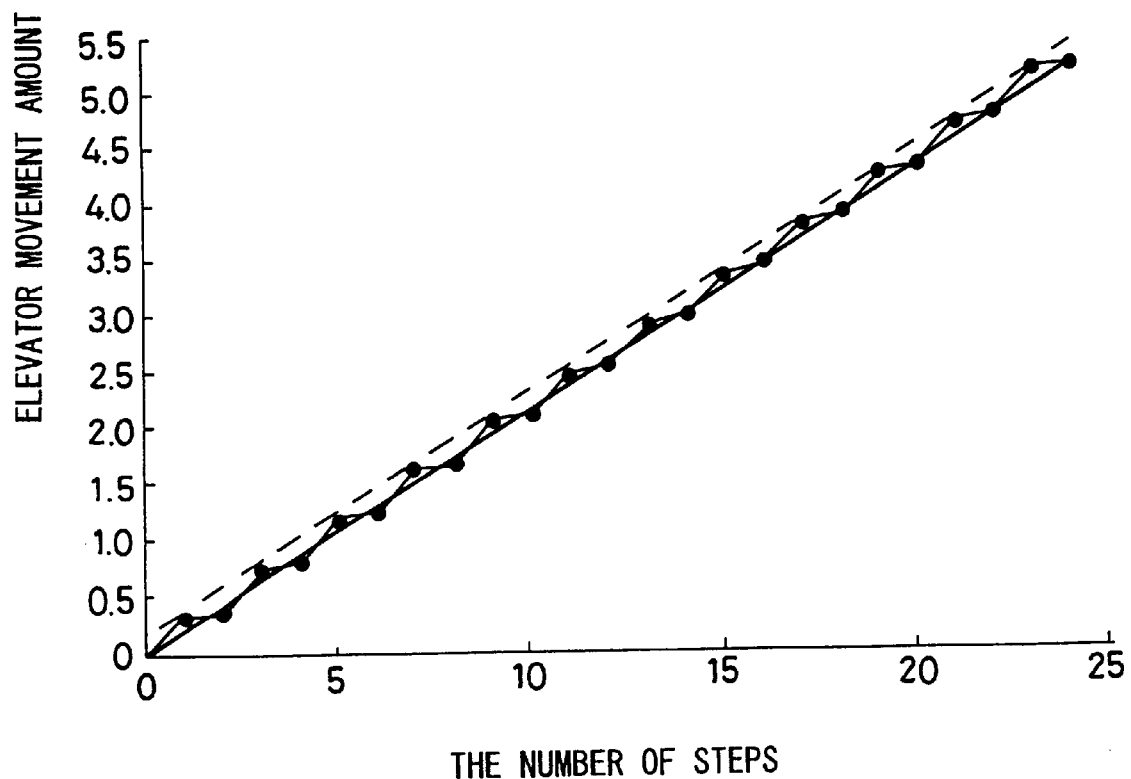
FIG. 15 is a graph for use in explanation of an example of the motor driving circuit in the disk exchanging apparatus to which the invention is applied.

As mentioned above, in the disk exchanging apparatus, when the stepping motor 11 is rotated, the elevator 7 is moved upward, namely, in the direction from the driving apparatuses 5A and 5B side to the enclosure 1 side or downward, in other words, in the direction from the enclosure 1 side toward the driving apparatuses 5A and 5B side. FIG. 15 shows a movement amount of the elevator 7 for the number of steps of the stepping motor 11. In FIG. 15, a broken line shows a movement amount of the elevator for the number of steps when the stepping motor is moved by the even-number steps. As will be also understood from FIG. 15, when the elevator 7 is moved by the even-number steps, the movement amount of the elevator 7 for the number of steps becomes linear and the positioning precision is improved.

Figure 16:
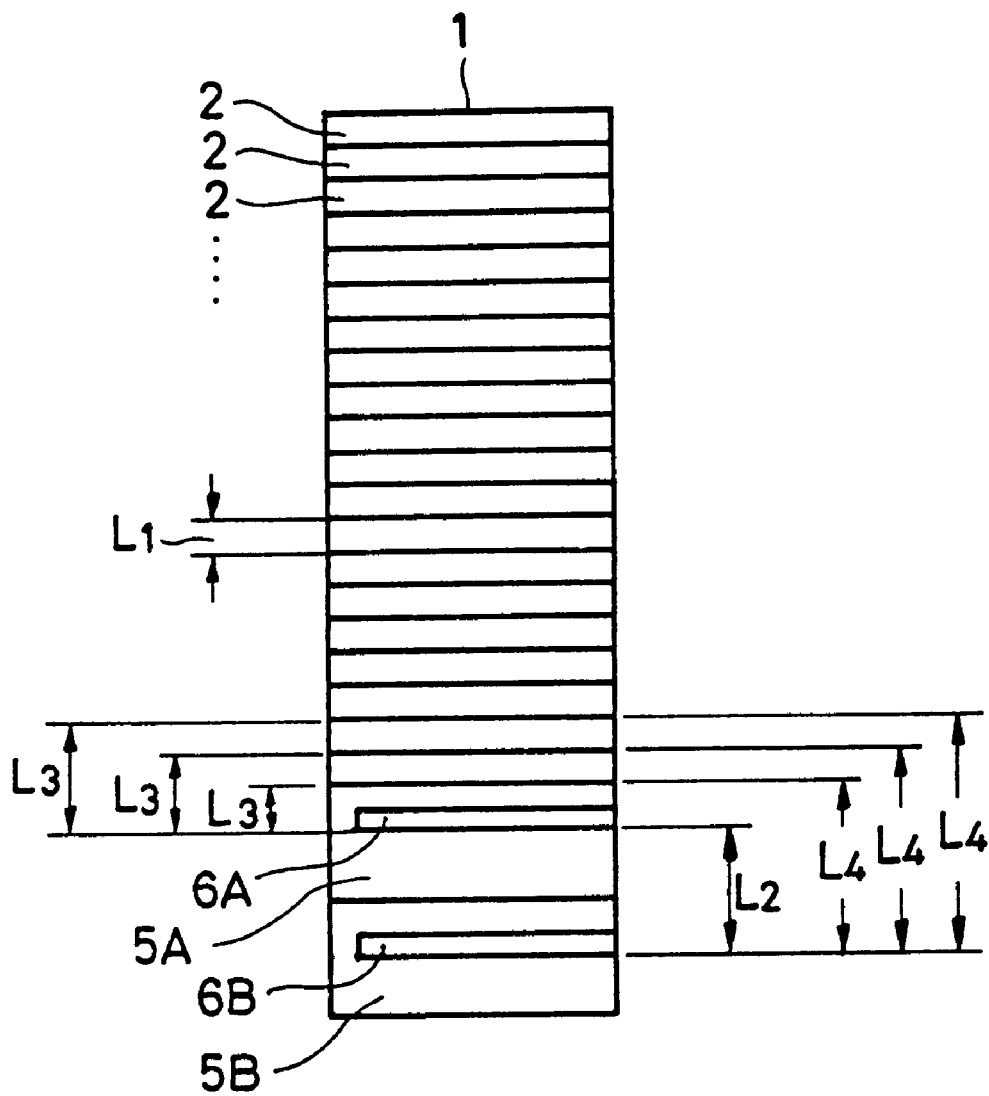
FIG. 16 is a side elevational view for use in explanation of an interval of a disk enclosure in an example of the disk exchanging apparatus to which the invention is applied.

In the disk exchanging apparatus to which the invention is applied, as shown in FIG. 16, all of a distance $L_1$ between the slots 2 of the disk enclosure 1, a distance $L_2$ between the opening portions 6A and 6B for loading the disk of the disk driving apparatuses 5A and 5B, and distances $L_3$ and $L_4$ between each slot 2 of the disk enclosure 1 and the opening portions 6A and 6B of the disk driving apparatuses 5A and 5B are set to distances corresponding to even-number steps of the stepping motor 11. For example, the distance $L_1$ between the slots 2 of the disk enclosure 1 is set to the distance corresponding to six steps of the stepping motor 11.

As mentioned above, all of the distances when the elevator 7 moves between each slot 2 of the disk enclosure 1 and the opening portions 6A and 6B of the disk driving apparatuses 5A and 5B are set to distances corresponding to even-number steps of the stepping motor 11. Therefore, the control when the elevator 7 is moved to the target position is as shown in FIG. 17.

Figure 17:
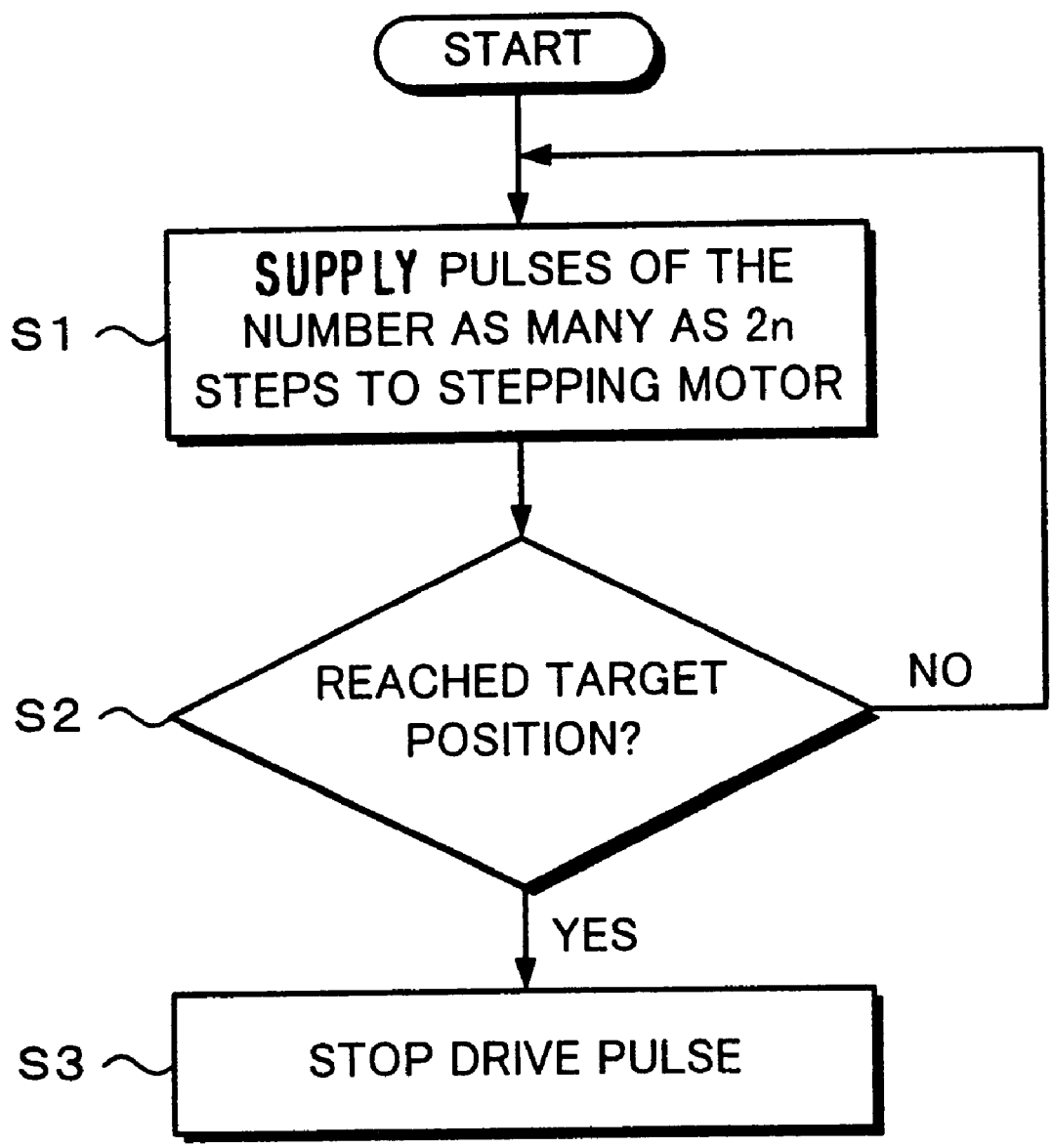
FIG. 17 is a flowchart for use in explanation of the motor driving circuit in the disk exchanging apparatus to which the invention is applied.

In FIG. 17, in case of moving the elevator 7 to the target position, pulses of the number as many as the number (2n: wherein, n is an integer) of steps are supplied as drive signals from the driving unit 32 to the stepping motor 11 by the driving command from the controller 31 (step S1). By the drive signal supplied in step S1, the stepping motor 11 is rotated by an amount corresponding to the even-number steps, so that the elevator 7 is moved.

The rotational angle of the stepping motor 11 is detected from the output of the FG generating circuit 34. From the output of the FG generating circuit 34, whether the elevator has reached a predetermined position between the enclosure 1 and the opening portions 6A and 6B or not is discriminated (step S2). The driving of the stepping motor 11 is continued until the elevator 7 reaches the predetermined position between the enclosure 1 and the opening portions 6A and 6B. When the elevator 7 reaches the predetermined position in step S2, the drive signal is stopped (step S3).

As mentioned above, all of the distances when the elevator 7 moves between each slot 2 of the disk enclosure 1 and the opening portions 6A and 6B of the disk driving apparatuses 5A and 5B are equal to the distances corresponding to even-number steps of the stepping motor 11, so that the stepping motor 11 when the elevator 7 is moved to the target position is always controlled by the even-number steps. Thus, the position control of the elevator 7 can be performed at high precision.

Actually, an offset amount (positional deviation from the origin in the initial state) from the origin of the elevator 7 including tolerances on design such as attaching error of the disk grasping mechanism 12, positional deviation between the slots 2, and the like occurs. Therefore, the offset amount has to be taken into consideration.

If the offset amount is equal to the even-number steps of the stepping motor 11, eventually, since the stepping motor 11 is always controlled by the even-number steps in the control when the elevator 7 is moved to the target position, there is no problem. However, in the case where the offset amount is equal to the odd-number steps of the stepping motor 11, the positional control of the elevator 7 cannot be performed by the even-number steps. For example, when the offset amount is equal to +1 (deviated upward by one step), for instance, the movement steps to the target positions set so that the elevator can be moved by 36 steps from the origin are equal to (36−1=35) steps and the elevator cannot be moved by the even-number steps.

When the offset amount corresponds to the odd-number steps, the origin when the elevator 7 is moved is controlled so as to be located on the lower side or upper side than the actual origin by the odd-number steps. For example, when the offset amount is equal to +1, the movement steps to the target position set so that the elevator can be moved by 36 steps from the origin are equal to 35 steps. In this case, the origin when the elevator 7 is moved is set to be located on the lower side by one step than the actual origin in the controller 31. With this method, in the controller 31, the elevator is moved by (35+1=36) steps and the elevator 7 can be moved by the even-number steps.

As mentioned above, in the disk exchanging apparatus according to the invention, the elevator 7 is moved by the stepping motor 11 and all of the distances between each slot 2 of the disk enclosure 1 and the opening portions 6A and 6B of the disk driving apparatuses 5A and 5B where the elevator 7 as a moving target moves are equal to the distances of the even-number steps of the stepping motor 11. Therefore, the stepping motor 11 can be always controlled by the even-number steps and the positioning precision of the elevator 7 can be improved.

AS mentioned above, in the disk exchanging apparatus to which the invention is applied, the elevator 7 is moved upward or downward by the stepping motor 11 provided in the elevator 7 and the elevator 7 is moved to the position of the slot 2 in which a desired optical disk is enclosed or the position where the driving apparatuses 5A and 5B face the opening portions 6A and 6B for loading the disk.

As mentioned above, when the elevator 7 is moved upward or downward by the stepping motor 11, a torque which is needed when the elevator 7 is moved upward, namely, is elevated and a torque which is needed when the elevator 7 is moved downward, namely, is lowered are different. As a torque when the elevator 7 is elevated, a large torque is necessary as compared with that in case of lowering the elevator 7 in order to move the elevator 7 against the self weight of the elevator 7 and the gravity. Since the self weight and the gravity are applied to the elevator 7 even when the elevator 7 is stopped, it is necessary to apply a predetermined driving current or driving voltage to the stepping motor 11 so as not to drop the elevator 7. Since it is sufficient that a force which is applied when the elevator 7 is stopped is equal to a force such that it is balanced to the total weight of the self weight of the elevator 7 and the gravity, a large torque like a torque which is required when the elevator 7 is driven upward or downward is unnecessary.

The rotational angle of the stepping motor 11 is determined by the number of steps as mentioned above and its driving voltage is hitherto set to be constant. That is, generally, the driving voltage is determined so that enough torque is generated by the operation (in this case, the operation to elevate the elevator 7) which needs the maximum operating power during the operation of the elevator 7.

However, the torque which is required for the stepping motor 11 when the elevator 7 is elevated and that when it is lowered are different due to the foregoing reasons. Further, even when the elevator 7 is stopped as well, it is necessary to apply the driving voltage to the stepping motor 11 so as to generate a certain degree of torque. When the driving voltage is determined so as to generate enough torque by the operation to elevate the elevator 7, such a driving voltage becomes an excessive driving voltage when the elevator 7 is lowered or stopped and the motor coil generates the heat. It results in a cause of a damage or deterioration in operating power. An electric power is vainly consumed.

In the disk exchanging apparatus to which the invention is applied, the driving voltage of the stepping motor 11 is switched when the elevator 7 is elevated, when the elevator 7 is lowered, and further, when the elevator 7 is stopped.

As described by using FIG. 14, when the stepping motor 11 is rotated, the elevator 7 is moved. In other words, the movement amount of the elevator 7 can be detected by the output of the FG generating circuit 34. On the basis of the output of the FG generating circuit 34, the controller 31 discriminates whether the elevator 7 has been moved by a predetermined amount or not. When it is detected that the elevator 7 is moved by the predetermined amount, the drive signal which is supplied from the controller 31 to the driving unit 32 is stopped.

The voltage of the drive signal to the stepping motor 11 can be switched by a voltage switching circuit 33 on the basis of the control of the controller 31. When the elevator 7 is elevated, namely, is moved upward, a large driving voltage (for example, 26V) is applied. When the elevator 7 is lowered, namely, is moved downward, a driving voltage (for example, 14V) smaller than it is applied. When the elevator 7 is stopped, an even smaller driving voltage (for example, 6V) is applied.

Figure 18A:
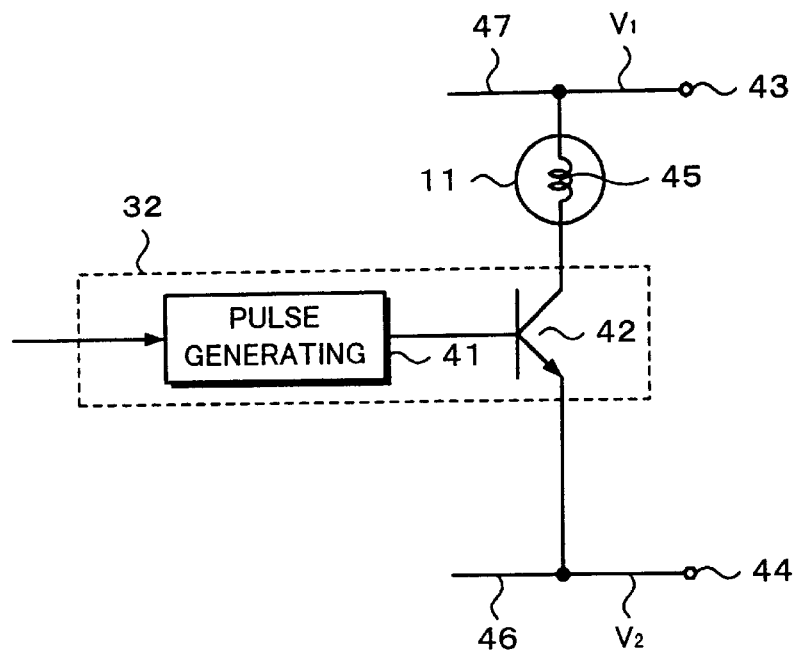
FIGS. 18A and 18B are connection diagrams for use in explanation of the driving circuit of the stepping motor.
Figure 18B:
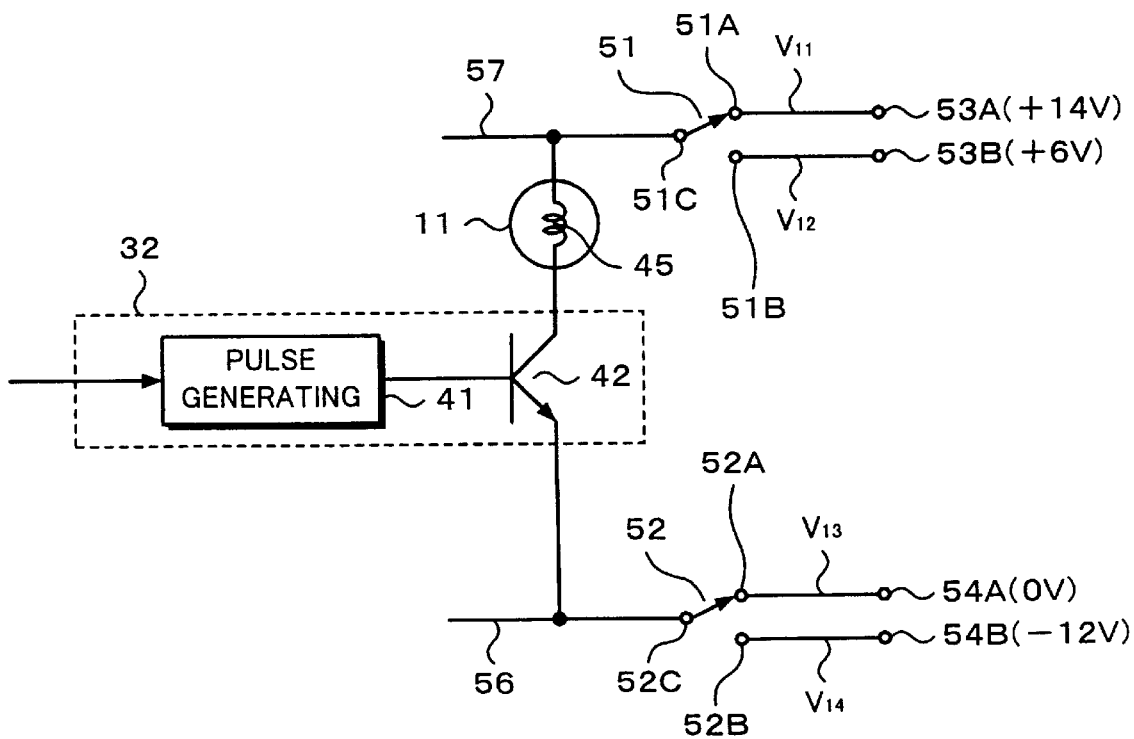

The driving voltage is switched as shown in FIGS. 18A and 18B. As shown in FIG. 18A, usually, the driving unit 32 to drive the stepping motor 11 is constructed by: a pulse generating circuit 41 to generate a pulse signal on the basis of a control signal from the controller 31; and a transistor 42 to drive the stepping motor 11.

The controller 31 generates the control signal on the basis of a discrimination result about whether the target position, namely, the position when moving is located in the upper direction or lower direction from the present position of the elevator 7, and supplies it to the driving unit 32. For example, when a disk exchanging command is inputted from a host computer to which the disk exchanging apparatus is connected or from an operating unit (not shown), the elevator 7 is first moved to the position where it faces the opening portion 6A or 6B. However, if the present position of the elevator 7 is located on the upper side than the opening portion 6A or 6B, the controller 31 generates the control signal to move the elevator 7 downward and supplies to the driving unit 32. The signal component showing the number of steps corresponding to the distance between the present position of the elevator 7 and the opening portion 6A or 6B is also included in the generated control signal. The present position of the elevator 7, namely, the position that is away from the origin of the elevator 7 by which number of steps mentioned above is grasped by the controller 31.

An output of the pulse generating circuit 41 is supplied to a base of the transistor 42. An emitter of the transistor 42 is connected to a power source line 46 from a power source terminal 44. A collector of the transistor 42 is connected to one end of a driving coil 45 of the stepping motor 11. The other end of the driving coil 45 of the stepping motor 11 is connected to a power source line 47 from a power source terminal 43.

When the pulse is generated from the pulse generating circuit 41, the transistor 42 is turned on and a driving current is supplied to the driving coil 45 of the stepping motor 11. The driving voltage in this instance is determined by a voltage $V_1$ which is applied to the power source terminal 43 and a voltage $V_2$ which is applied to the power source terminal 44.

The driving unit 32 in which the driving voltage can be switched can be constructed as shown in FIG. 18B. That is, an output of the pulse generating circuit 41 is supplied to the base of the transistor 42. The emitter of the transistor 42 is connected to a power source line 56. The power source line 56 is connected to a terminal 52C of a switching circuit 52.

A terminal 52A of the switching circuit 52 is connected to a power source terminal 54A of a power voltage $V_{13}$. A terminal 52B of the switching circuit 52 is connected to a power source terminal 54B of a power voltage $V_{14}$.

The collector of the transistor 42 is connected to one end of the driving coil 45 of the stepping motor 11. The other end of the driving coil 45 of the stepping motor 11 is connected to a power source line 57. The power source line 57 is connected to a terminal 51C of a switching circuit 51.

A terminal 51A of the switching circuit 51 is connected to a power source terminal 53A of a power voltage $V_{11}$. A terminal 51B of the switching circuit 51 is connected to a power source terminal 53B of a power voltage $V_{12}$.

When the pulse is generated from the pulse generating circuit 41, the transistor 42 is turned on and a driving current is supplied to the driving coil 45. In this instance, the driving voltage which is applied to the driving coil 45 of the stepping motor 11 can be switched in accordance with the states of the switching circuits 51 and 52.

For example, it is now assumed that the power voltage $V_{11}$ of the power source terminal 53A is equal to +14V and the power voltage $V_{12}$ of the power source terminal 53B is equal to +6V. it is assumed that the power voltage $V_{13}$ of the power source terminal 54A is equal to 0V and the power voltage $V_{14}$ of the power source terminal 54B is equal to −12V.

In this case, when the switching circuit 51 is set to the terminal 51A side and the switching circuit 52 is set to the terminal 52B side, the driving voltage is $$V_{11}-V_{14}=14V-(-12V)=26V$$

When the switching circuit 51 is set to the terminal 51A side and the switching circuit 52 is set to the terminal 52A side, the driving voltage is $$V_{11}-V_{13}=14V-(0V)=14V$$

When the switching circuit 51 is set to the terminal 51B side and the switching circuit 52 is set to the terminal 52B side, the driving voltage is $$V_{12}-V_{14}=6V-(-12V)=18V$$

When the switching circuit 51 is set to the terminal 51B side and the switching circuit 52 is set to the terminal 52A side, the driving voltage is $$V_{12}-V_{13}=6V-(0V)=6V$$

As mentioned above, by providing the switching circuits 51 and 52, the driving voltage which is applied to the driving coil 45 of the stepping motor 11 can be switched.

In the above example, for simplicity of explanation, the driving coil of the stepping motor 11 has been shown as one coil 45. However, a motor using a multiphase coil is actually used as a stepping motor 11. For instance, in case of using a motor having a 4-phase coil as a stepping motor 11, a construction of the driving circuit is as shown in FIG. 19.

Figure 19:
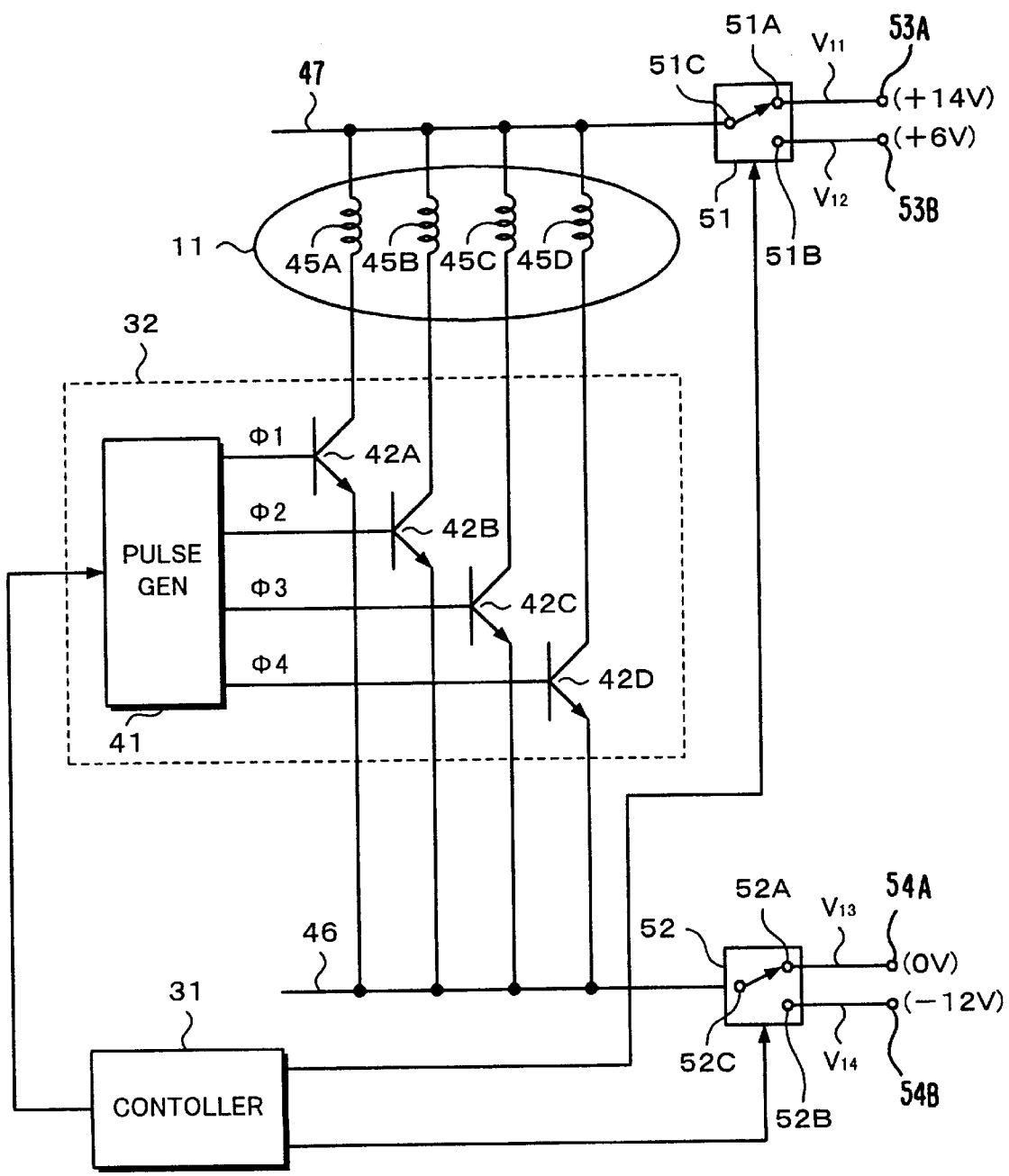
FIG. 19 is a connection diagram of the driving circuit of the stepping motor.

In FIG. 19, an output of the controller 31 is supplied to the driving unit 32. The driving unit 32 comprises the pulse generating circuit 41 and transistors 42A, 42B, 42C, and 42D. The pulse generating circuit 41 forms drive signals, $\phi_1$, $\phi_2$, $\phi_3$, and $\phi_4$ of four phases in response to the driving command from the controller 31.

The drive signals $\phi_1$, $\phi_2$, $\phi_3$, and $\phi_4$ from the pulse generating circuit 41 are supplied to bases of the transistors 42A, 42B, 42C, and 42D, respectively. Emitters of the transistors 42A, 42B, 42C, and 42D are connected to the power source line 46. The power source line 46 is connected to the terminal 52C of the switching circuit 52. The terminal 52A of the switching circuit 52 is connected to the power source terminal 54A of the voltage $V_{13}$. The terminal 52B of the switching circuit 52 is connected to the power source terminal 54B of the voltage $V_{14}$.

Collectors of the transistors 42A, 42B, 42C, and 42D are connected to one end of each of driving coils 45A, 45B, 45C, and 45D of the stepping motor 11, respectively. The other ends of the driving coils 45A, 45B, 45C, and 45D are connected to the power source line 47, respectively. The power source line 47 is connected to the terminal 51C of the switching circuit 51. The terminal 51A of the switching circuit 51 is connected to the power source terminal 53A of the voltage $V_{11}$. The terminal 51B of the switching circuit 51 is connected to the power source terminal 53B of the voltage $V_{12}$.

Figure 20:
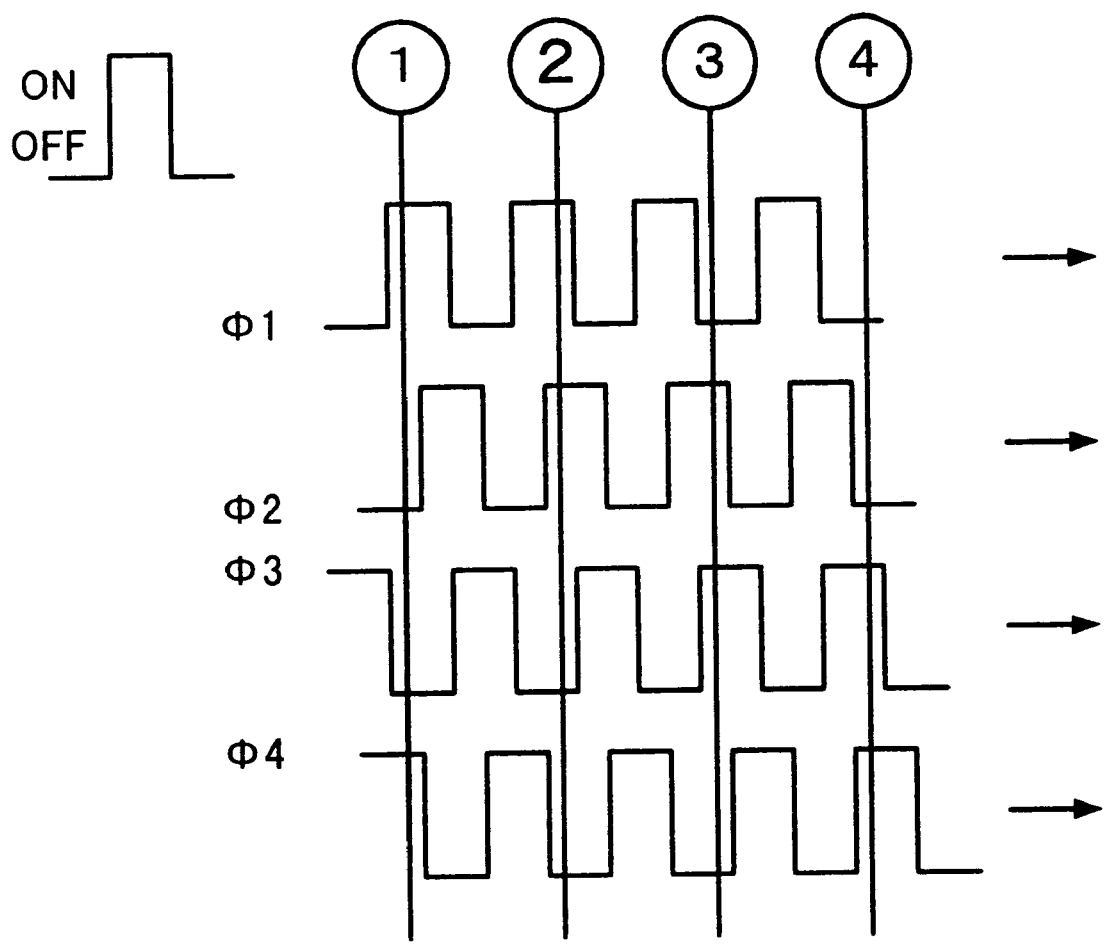
FIG. 20 is a timing chart for use in explanation of the driving circuit of the stepping motor.

On the basis of a command from the controller 31, the drive signals $\phi_1$, $\phi_2$, $\phi_3$, and $\phi_4$ of four phases as shown in FIG. 20 are generated from the pulse generating circuit 41. By the drive signals $\phi_1$, $\phi_2$, $\phi_3$, and $\phi_4$, the transistors 42A and 42D are turned on and the transistors 42B and 42C are turned on at time point $T_1$. The transistors 42A and 42B are turned off and the transistors 42C and 42D are turned on at time point $T_2$. The transistors 42B and 42C are turned on and the transistors 42A and 42D are turned off at time point $T_3$. The transistors 42C and 42D are turned on and the transistors 42A and 42B are turned off at time point $T_4$.

The driving current is supplied to the driving coils 45A, 45B, 45C, and 45D of the stepping motor 11 corresponding to the transistors 42A, 42B, 42C, and 42D in the ON state. The driving voltage in this instance can be switched in accordance with the states of the switching circuits 51 and 52. For example, the power voltage $V_{11}$ of the power source terminal 53A is set to +14V. The power voltage $V_{12}$ of the power source terminal 53B is set to +6V. The power voltage $V_{13}$ of the power source terminal 54A is set to 0V. The power voltage $V_{14}$ of the power source terminal 54B is set to −12V.

Figure 21:
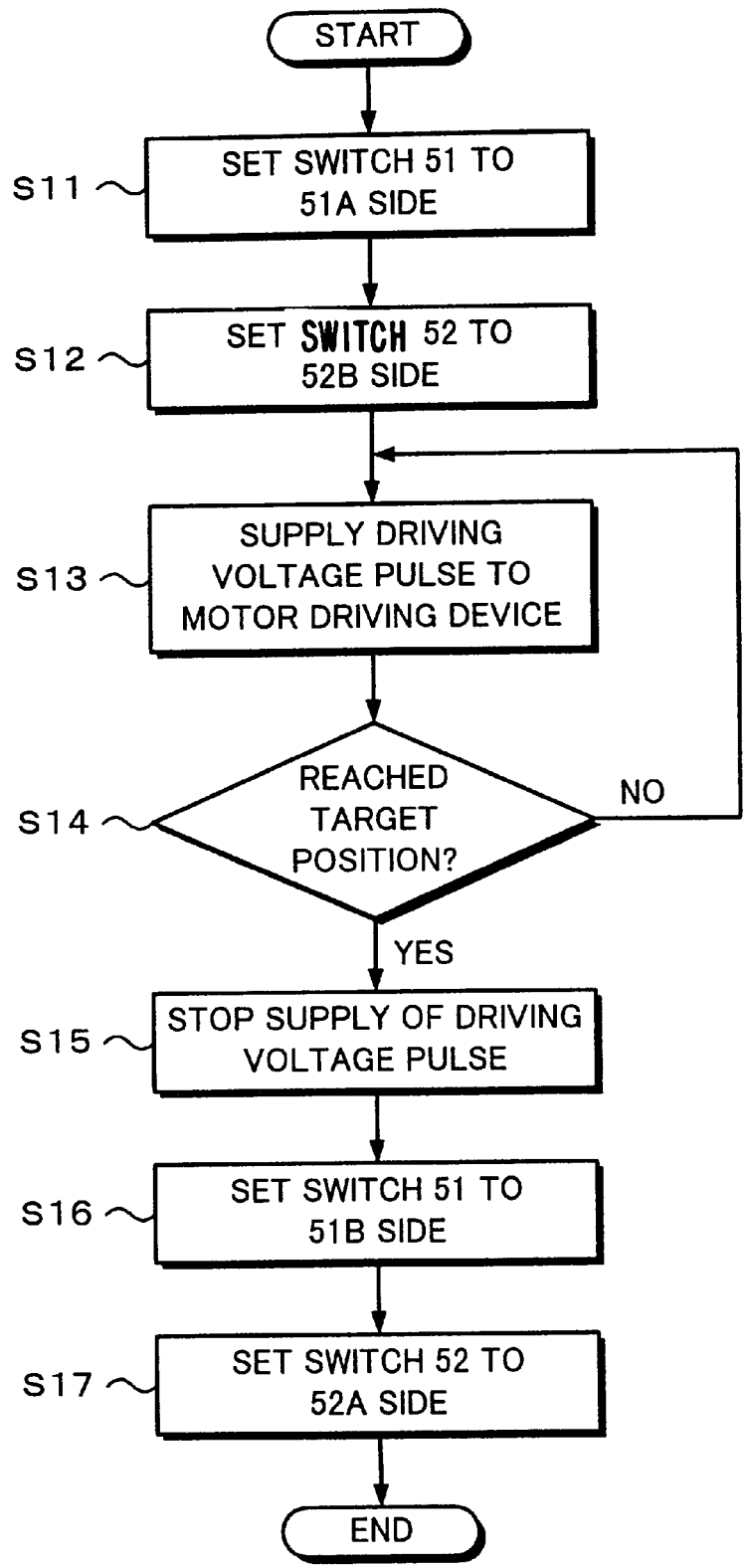
FIG. 21 is a flowchart for use in explanation of the driving circuit of the stepping motor.

FIG. 21 is a flowchart showing processes when the elevator 7 is elevated. In the initial state, the switching circuit 51 is set to the terminal 51B side and the switching circuit 52 is set to the terminal 52A side. Since the power voltage $V_{12}$ of the power source terminal 53B is set to +6V and the power voltage $V_{13}$ of the power source terminal 54A is set to 0V, the driving voltage which is applied to the driving coil in the ON state in the initial state among the driving coils 45A, 45B, 45C, and 45D is $$V_{12}-V_{13}=6V-0V=6V$$

When the elevator 7 is elevated, the switching circuit 51 is switched to the terminal 51A side (step S11) and the switching circuit 52 is switched to the terminal 52B side (step S12). The drive signal from the pulse generating circuit 41 is supplied to the transistors 42A, 42B, 42C, and 42D (step S13).

The power voltage $V_{11}$ of the power source terminal 53A is set to +14V and the power voltage $V_{14}$ of the power source terminal 54B is set to −12V. Therefore, when the switching circuit 51 is set to the terminal 51A side and the switching circuit 52 is set to the terminal 52B side, the driving voltage which is applied to the driving coil in the ON state among the driving coils 45A, 45B, 45C, and 45D is $$V_{11}-V_{14}=14V-(-12V)=26V$$

As mentioned above, by supplying the drive signal of the voltage of, for example, 26V, the stepping motor 11 is rotated and the elevator 7 is guided by the guiding mechanism (not shown) and is elevated. Whether the elevator 7 has been elevated to the target position or not is discriminated (step S14).

When the elevator 7 reaches the target position, the supply of the drive signal supplied to the stepping motor 11 is stopped (step S15). The switching circuit 51 is set to the terminal 51B side (step S16) and the switching circuit 52 is set to the terminal 52A side (step S17). When the switching circuit 51 is set to the terminal 51B side and the switching circuit 52 is set to the terminal 52A side, the driving voltage which is applied to the driving coil in the ON state among the driving coils 45A, 45B, 45C, and 45D is $$V_{12}-V_{13}=6V-0V=6V$$

As mentioned above, when the elevator 7 is elevated, 26V as a maximum driving voltage is applied to the stepping motor 11 and the elevator 7 is elevated. When the elevator 7 is stopped, the driving voltage of 6V is applied to the stepping motor 11 and the elevator 7 is held at the position where it has been elevated.

Figure 22:
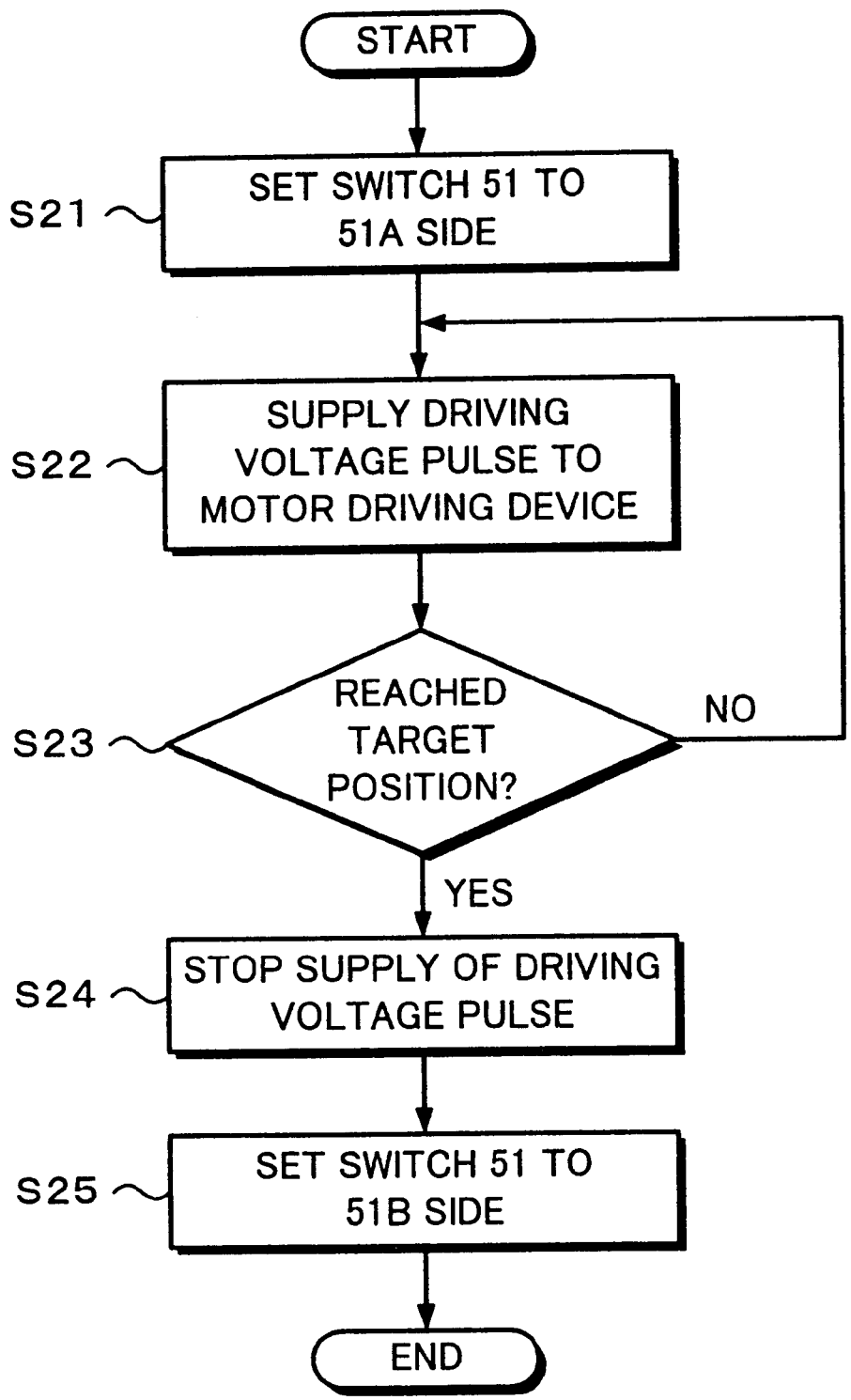
FIG. 22 is a flowchart for use in explanation of the driving circuit of the stepping motor.

FIG. 22 is a flowchart showing processes when the elevator 7 is lowered. In the initial state, the switching circuit 51 is set to the terminal 51B side and the switching circuit 52 is set to the terminal 52A side. Since the power voltage $V_{12}$ of the power source terminal 53B is set to +6V and the power voltage $V_{13}$ of the power source terminal 54A is set to 0V, the driving voltage which is applied to the driving coil in the ON state in the initial state among the driving coils 45A, 45B, 45C, and 45D is $$V_{12}-V_{13}=6V-0V=6V$$

When the elevator 7 is lowered, the switching circuit 51 is switched to the terminal 51A side (step S21). The drive signal from the pulse generating circuit 41 is supplied to the transistors 42A, 42B, 42C, and 42D (step S22).

The power voltage $V_{11}$ of the power source terminal 53A is set to +14V and the power voltage $V_{14}$ of the power source terminal 54A is set to 0V. Therefore, when the switching circuit 51 is set to the terminal 51A side, the driving voltage which is applied to the driving coil in the ON state among the driving coils 45A, 45B, 45C, and 45D is $$V_{11}-V_{13}=14V-0V=14V$$

As mentioned above, by supplying the drive signal of the voltage of, for example, 14V, the stepping motor 11 is rotated and the elevator 7 is guided by the guiding mechanism (not shown) and is lowered. Whether the elevator 7 has been lowered to the target position or not is discriminated (step S23).

When the elevator 7 reaches the target position, the supply of the drive signal supplied to the stepping motor 11 is stopped (step S24). The switching circuit 51 is set to the terminal 51B side (step S25). When the switching circuit 51 is set to the terminal 51B side and the switching circuit 52 is set to the terminal 52A side, the driving voltage which is applied to the driving coil in the ON state among the driving coils 45A, 45B, 45C, and 45D is $$V_{11}-V_{13}=6V-0V=6V$$

As mentioned above, when the elevator 7 is lowered, 14V as a driving voltage is applied to the stepping motor 11 and the elevator 7 is lowered. When the elevator 7 is stopped, the driving voltage of 6V is applied to the stepping motor 11 and the position of the elevator 7 is held.

In the disk exchanging apparatus like an invention as mentioned above, the elevator 7 is moved upward or downward by the stepping motor 11 provided in the elevator 7, thereby moving the elevator 7 to the position of the slot 2 in which the desired optical disk is enclosed or the position where the elevator faces the opening portion 6A or 6B of the disk driving apparatus 5A or 5B. In case of driving the elevator 7 upward or downward as mentioned above, even when the elevator 7 is stopped, the self weight of the elevator 7 is applied. Therefore, in the disk exchanging apparatus according to the invention, in order to stop and hold the elevator 7 at the stop position, even when the elevator 7 is stopped, a predetermined driving voltage is applied to the stepping motor 11 and a torque is developed in the stepping motor 11, thereby allowing the stepping motor 11, in other words, the elevator 7 to be stopped at this position.

According to such a construction, however, if the power source is suddenly shut off or a power failure occurs, the torque of the stepping motor 11 disappears and a situation such that the elevator 7 suddenly drops due to the self weight can occur.

Figure 23:
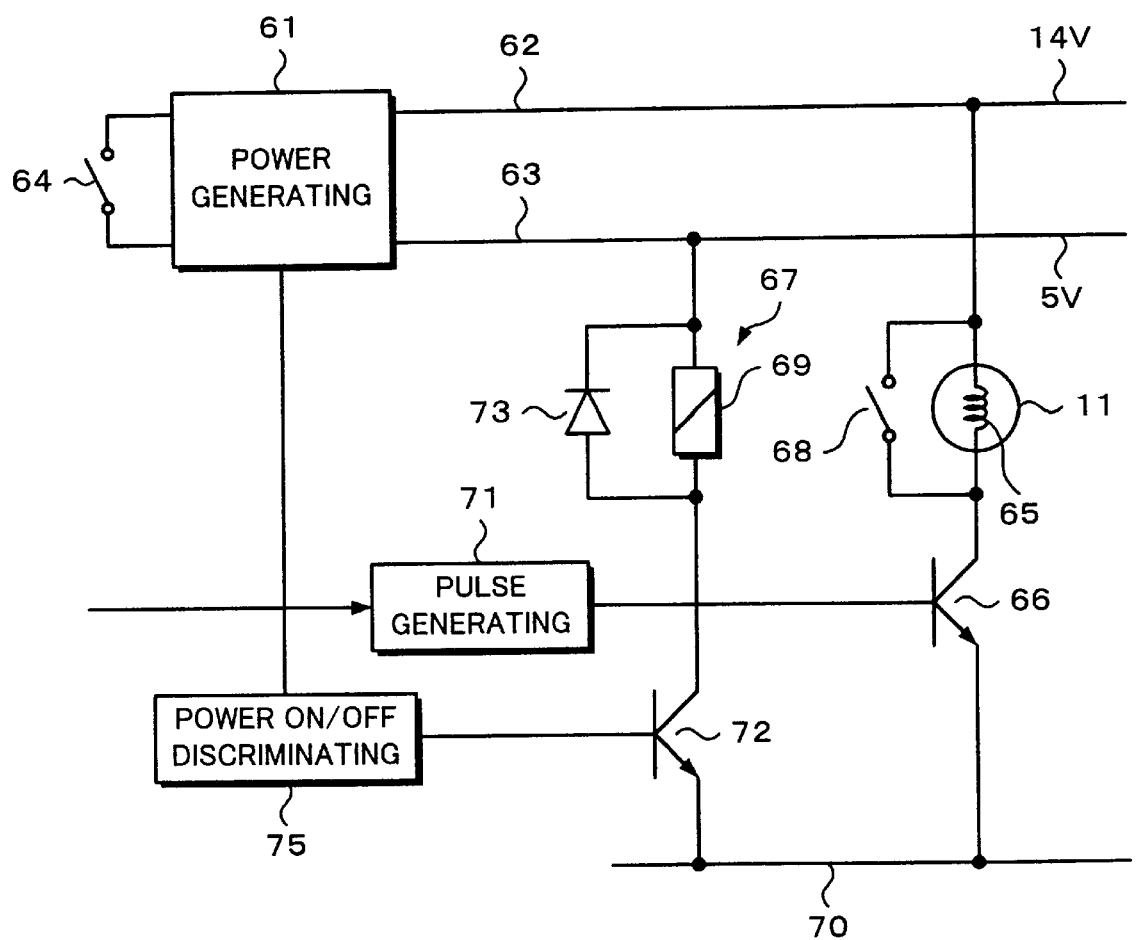
FIG. 23 is a connection diagram for use in explanation of another example of the driving circuit of the disk exchanging apparatus to which the invention is applied.

Therefore, in the disk exchanging apparatus as another embodiment according to the invention, as shown in FIG. 23, a circuit for detecting the shut-off of the power supply and short-circuiting a coil 65 of the stepping motor 11 is provided, thereby preventing the elevator 7 from dropping when the power supply is shut off. Although the case of using the stepping motor 11 will now be described hereinbelow on the basis of the foregoing embodiments, this another embodiment can be also applied to a case of using a motor other than the stepping motor.

In FIG. 23, a power generating circuit 61 generates a power source necessary for driving the stepping motor 11. A power source line 62 of the power voltage of, for example, 14V and a power source line 63 of, for instance, 5V are led out from the power generating circuit 61. The power source from the power source line 62 is a power source of a large current to drive the motor. The power source from the power source line 63 is a power source to make a logic circuit operative and is a power source of a small current; however, a stable voltage is held. Since the power source from the power source line 63 is the small current although the power source of the power source line 62 is the large current, the power source from the power source line 63 can more rapidly rise or fall than the power source from the power source line 62. A power switch 64 is attached to the power generating circuit 61.

One end of the coil 65 of the stepping motor 11 is connected to the power source line 62. The other end of the coil 65 of the stepping motor 11 is connected to a collector of a transistor 66. A movable switch 68 of a relay 67 is connected across the coil 65 of the stepping motor 11. The movable switch 68 of the relay 67 is turned off while the current is supplied to the relay coil 69. When the supply of the current flowing to a coil 69 is stopped, the movable switch 68 is turned on.

An emitter of the transistor 66 is connected to a grounding line 70. An output of a pulse generating circuit 71 is supplied to a base of the transistor 66. The pulse generating circuit 71 generates a pulse signal in response to the driving command from the controller 31 shown in FIG. 14. The driving unit 32 in FIG. 14 is constructed by the pulse generating circuit 71 and transistor 66.

One end of the coil 69 of the relay 67 is connected to the power source line 63. The other end of the coil 69 of the relay 67 is connected to a collector of a transistor 72. A reverse current preventing diode 73 is connected across the coil 69 of the relay 67.

An emitter of the transistor 72 is connected to the grounding line 70. An output of a power on/off discriminating circuit 75 is supplied to a base of the transistor 72. The power on/off discriminating circuit 75 discriminates whether the power voltage has been supplied from the power generating circuit 61 to the power source lines 62 and 63 or not.

The drive signal is generated from the pulse generating circuit 71 in response to the driving command from the controller 31. The transistor 66 is turned on/off by the drive signal from the controller 31. When the transistor 66 is turned on, the driving current is supplied to the driving coil 65 of the stepping motor 11. By turning on/off the transistor 66 by the drive signal as mentioned above, the stepping motor 11 is rotated.

An output of the power on/off discriminating circuit 75 is set to the high level while the power source is supplied from the power generating circuit 61 to the power source lines 62 and 63. When the output of the power on/off discriminating circuit 75 is at the high level, the transistor 72 is turned on and the current is supplied to the coil 69 of the relay 67. The relay 67 turns off the movable switch 68 while the current is flowing in the coil 69.

When the supply of the power voltage to the power source lines 62 and 63 from the power generating circuit 61 is stopped, the output of the power on/off discriminating circuit 75 is set to the low level. When the output of the power on/off discriminating circuit 75 is set to the low level, the transistor 72 is turned off and the supply of the current to the coil 69 of the relay 67 is stopped. When no current flows in the coil 69 of the relay 67, the movable switch 68 is turned on. When the movable switch 68 is turned on, a portion across the coil 65 of the stepping motor 11 is short-circuited.

That is, as shown in FIG. 24A, it is now assumed that the supply of the power voltage from the power generating circuit 61 to the power source line 62 is stopped at time point $t_1$. When the supply of the power voltage from the power generating circuit 61 to the power source line 62 is stopped, the torque of the stepping motor 11 disappears and the elevator 7 is lifted down.

At this time, as shown in FIG. 24B, the output of the power on/off discriminating circuit 75 is set to the low level. Thus, as shown in FIG. 24C, the movable switch 68 of the relay 67 is turned on and the coil 65 of the stepping motor 11 is short-circuited.

When the coil 65 of the stepping motor 11 is short-circuited as mentioned above, a counter electromotive force is generated in the coil 65 when the elevator 7 is lifted down by the self weight. By the counter electromotive force, a torque in the direction to elevate the elevator 7 is generated in the stepping motor 11. This torque functions as a brake, thereby avoiding the elevator 7 from suddenly dropping.

In the disk exchanging apparatus according to another embodiment of the invention as mentioned above, the turn-off of the power source is detected and the portion across the coil 65 of the stepping motor 11 is short-circuited. Therefore, even if the supply of the power source is suddenly stopped by a power failure or the like, the elevator 7 does not suddenly drop.

When the power source is again turned on, the output of the power on/off discriminating circuit 75 is set to the high level, the transistor 72 is turned on, and the movable switch 68 of the relay 67 is turned off. Therefore, the voltage from the power source line 62 is applied to the coil 65 of the stepping motor 11. In this instance, after the movable switch 68 of the relay 67 was turned off, if the power source from the power source line 62 is supplied to the coil 65, there is no problem. However, when the timing is reversed and the power source from the power source line 62 is supplied to the coil 65, if the movable switch 68 of the relay 67 is held in the ON state, since the coil 65 has been short-circuited, a large current flows.

However, as mentioned above, since the power source from the power source line 63 more rapidly rises than the power source from the power source line 62, the voltage from the power source line 62 is applied to the coil 65 certainly after the turn-off of the movable switch 68 of the relay 67. Consequently, such a problem does not occur.

The disk exchanging apparatus in which the optical disk such as a CD-ROM is reproduced has been described above. However, it will be obviously understood that the invention can be also applied to the other kinds of exchanging apparatuses such as exchanging apparatus for recording/reproducing a tape cassette in which data or video signal has been recorded, exchanging apparatus for recording and/or reproducing data to/from an optical disk enclosed in a disk cartridge, and the like.

The present invention is not limited to the foregoing embodiments but many modifications and variations are possible within the spirit and scope of the appended claims of the invention.

What is claimed is:

1. A driving apparatus using a motor, comprising:
   a stepping motor for generating a driving force;
   a moving mechanism for moving an object to be driven to a raised position, to a lowered position, and for holding the object at least in said raised position and in said lowered position on the basis of said driving force of said stepping motor, said moving mechanism moving said object between said raised position and said lowered position on the basis of a plurality of even-number steps of said stepping motor;
   a driving circuit for supplying a plurality of drive signal pulses equal to an even-number of steps to said stepping motor; and
   a power circuit for supplying a first voltage to said stepping motor when moving said object to said raised position, supplying a second voltage less than said first voltage to said stepping motor when moving said object to said lowered position, and for supplying a third voltage less than said second voltage to said stepping motor when holding said object in said raised position.

2. The driving apparatus according to claim 1, further comprising:
   a rotation detecting unit for detecting a rotation of said stepping motor,
   wherein said driving circuit controls said stepping motor on the basis of a detection signal from said rotation detecting unit.

3. The driving apparatus according to claim 1, wherein said driving circuit includes a circuit for switching a setting of an origin of said object when said object is moved a deviation amount from said origin.

4. The driving apparatus according to claim 3, wherein said origin of said object when said object is moved is set so that said object is moved by said plurality of even-number steps of said stepping motor.

5. A driving method using a motor, comprising the steps of:
   setting a plurality of distances among a plurality of moving points on the basis of a plurality of even-number steps of a stepping motor;
   moving an object to be driven to a raised position and to a lowered position on the basis of a driving force of said stepping motor by supplying a plurality of drive signal pulses equal to an even-number of steps to said stepping motor;
   holding the object to the driven in at least said raised position;
   supplying a first voltage to said stepping motor for moving the object to be driven to said raised position;
   supplying a second voltage less than said first voltage to said stepping motor when moving said object to be driven to said lowered position; and
   supplying a third voltage less than said second voltage to said stepping motor when performing said step of holding.

6. The driving method according to claim 5, wherein a setting of an origin of said object when said object is moved is switched on the basis of a deviation amount of said object from said origin.

7. The driving method according to claim 6, wherein said origin of said object when said object is moved is set so that said object is moved by said plurality of even-number steps of said stepping motor.

8. An exchanging apparatus of a recording medium, comprising:
   an enclosure for enclosing a plurality of recording media;
   a recording and/or reproducing unit for executing a recording and/or reproduction of said plurality of recording media;
   a conveying mechanism for pulling out said plurality of recording media enclosed in said enclosure from said enclosure and for conveying said plurality of pulled-out recording media to said recording and/or reproducing unit; and
   a moving mechanism for moving said conveying mechanism between said enclosure and said recording and/or reproducing unit,
      wherein said moving mechanism has a stepping motor, a driving circuit, and a voltage supplying circuit, whereby on the basis of a driving force of said stepping motor said moving mechanism moves said conveying mechanism among a plurality of positions between said enclosure and said recording and/or reproducing unit including a raised position and a lowered position and said moving mechanism holds said conveying mechanism at least at said raised position, said plurality of positions being set on the basis of a plurality of even-number steps of said stepping motor, wherein said driving circuit supplies a plurality of drive signal pulses equal to an even-number of steps to said stepping motor, and wherein said voltage supplying circuit supplies a first voltage to said stepping motor to move to said raised position, supplies a second voltage less than said first voltage to move to said lowered position, and supplies a third voltage less than said second voltage to said stepping motor to hold said conveying mechanism in said raised position.

9. The exchanging apparatus according to claim 8, wherein said moving mechanism further includes a rotation detecting unit for detecting a rotation of said stepping motor and said driving circuit includes a circuit for controlling said stepping motor on the basis of a detection signal from said rotation detecting unit.

10. The exchanging apparatus according to claim 8, wherein said driving circuit includes a circuit for switching a setting of an origin of said plurality of recording media when said conveying mechanism is moved a deviation amount of said conveying mechanism from said origin.

11. The exchanging apparatus according to claim 10, wherein said origin of said plurality of recording media when said conveying mechanism is moved is set so that said conveying mechanism is moved by said plurality of even-number steps of said stepping motor.

12. The exchanging apparatus according to claim 8, wherein said driving circuit includes a circuit for switching a driving voltage of said stepping motor on the basis of a moving direction when said conveying mechanism is moved between said enclosure and said recording and/or reproducing unit.

13. The exchanging apparatus according to claim 12, wherein said driving circuit includes a circuit for switching said driving voltage of said stepping motor when said conveying mechanism is moved and when said conveying mechanism is stopped.

14. The exchanging apparatus according to claim 8, wherein when a power source is shut off, said driving circuit includes a circuit for short-circuiting a portion of a coil of said stepping motor.

15. The exchanging apparatus according to claim 14, wherein said driving circuit further includes
   a power shut-off detecting unit for detecting a shut-off of said power source, and wherein said circuit for short-circuiting said portion of said coil of said stepping motor operates on the basis of a detection signal from said power shut-off detecting unit.

16. The exchangina apparatus according to claim 8, wherein said plurality of recording media are enclosed in said enclosure in a laminated state.

17. A driving method of an exchanging apparatus of a recording medium, wherein said exchanging apparatus includes an enclosure for enclosing a plurality of recording media, a recording and/or reproducing unit for performing a recording and/or reproduction of said plurality of recording media, a conveying mechanism for pulling out said plurality of recording media enclosed in said enclosure from said enclosure and for conveying said plurality of pulled-out recording media to said recording and/or reproducing unit, and a stepping motor for moving said conveying mechanism, said driving method comprising the steps of:

supplying a plurality of drive signal pulses equal to a plurality of even-number steps to said stepping motor;

on the basis of a driving force of said stepping motor, moving said conveying mechanism among a plurality of positions between said enclosure and said recording and/or reproducing unit including a raised position and a lowered position and holding the conveying mechanism at least at said raised position, wherein the plurality of positions are set on the basis of said plurality of even-number steps of said stepping motor;

supplying a first voltage to the stepping motor for moving the conveying mechanism to the raised position;

supplying a second voltage less than the first voltage to the stepping motor for moving the conveying mechanism to the lowered position; and supplying a third voltage less than said second voltage to said stepping motor for holding the conveying mechanism at least at said raised position.

18. The driving method according to claim 17, wherein a setting of an origin of said plurality of recording media when said conveying mechanism is moved is switched on the basis of a deviation amount of said conveying mechanism from said origin.

19. The driving method according to claim 18, wherein said origin of said plurality of recording media when said conveying mechanism is moved is set so that said conveying mechanism is moved by said plurality of even-number steps of said stepping motor.

20. The driving method according to claim 17, wherein a driving voltage of said stepping motor is switched on the basis of a moving direction when said conveying mechanism is moved between said enclosure and said recording and/or reproducing unit.

21. The driving method according to claim 20, wherein said driving voltage of said stepping motor is switched when said conveying mechanism is moved and when said conveying mechanism is stopped.

22. The driving method according to claim 17, wherein when a power source is shut off, a portion of a coil of said stepping motor is short-circuited.

23. An exchanging apparatus of a recording medium, comprising:

an enclosure for enclosing a plurality of recording media in a laminated state;

a recording and/or reproducing unit for performing a recording and/or reproduction of said plurality of recording media;

a conveying mechanism for pulling out said plurality of recording media enclosed in said enclosure from said enclosure and for conveying said plurality of pulled out recording media to said recording and/or reproducing unit; and a moving mechanism for elevating up/down said conveying mechanism between a raised position and a lowered position and for moving said conveying mechanism between said enclosure and said recording and/or reproducing unit, wherein said moving mechanism has a stepping motor, a driving circuit, and a power supplying circuit and said driving circuit provides driving pulses in even numbers to said stepping motor for driving said conveying mechanism between said enclosure and said recording and/or reproducing unit and said power supply circuit supplies a first voltage to said stepping motor when moving said conveying mechanism to said raised position, supplies a second voltage less than said first voltage to said stepping motor when moving said conveying mechanism to said lowered position, and supplies a third voltage less than said second voltage to said stepping motor for holding said conveying mechanism at said raised position.

24. The exchanging apparatus according to claim 23, wherein said driving circuit includes a circuit for switching said driving voltage when said conveying mechanism is elevated upwardly by said moving mechanism and when said conveying mechanism is moved downwardly.

25. The exchanging apparatus according to claim 23, wherein said driving circuit includes a switching circuit for switching said driving voltage when said conveying mechanism is elevated upwardly by said moving mechanism and when said conveying mechanism is moved downwardly.

26. The exchanging apparatus according to claim 23, wherein said switching circuit switches said driving voltage of said stepping motor when said conveying mechanism is moved and when said conveying mechanism is stopped.

27. The exchanging apparatus according to claim 23, wherein when the power supplying circuit is shut off, said driving circuit includes a circuit for short-circuiting a portion across a coil of said stepping motor.

28. The exchanging apparatus according to claim 27, wherein said driving circuit further includes a power shut-off detecting unit for detecting a shut-off of said power source, and;

wherein said circuit for short-circuiting said portion of said coil of said stepping motor operates on the basis of a detection signal from said power shut-off detecting unit.

29. An exchanging apparatus of a recording medium, comprising:

an enclosure for enclosing a plurality of recording media;

a recording and/or reproducing unit for performing a recording and/or reproduction of said plurality of recording media;

a conveying mechanism for pulling out said plurality of recording media enclosed in said enclosure from said enclosure and for conveying said plurality of pulled-out recording media to said recording and/or reproducing unit; and a moving mechanism for elevating up/down said conveying mechanism between a raised position and a lowered position and for moving said conveying mechanism between said enclosure and said recording and/or reproducing unit, wherein said moving mechanism has a stepping motor, a power supply circuit, and a driving circuit and said driving circuit short-circuits a portion of a coil of said motor when a power source to said power supply circuit is shut off and said power supply circuit provides a first voltage to said stepping motor for moving said conveying mechanism to said raised position, provides a second voltage less than said first voltage to said stepping motor for moving said conveying mechanism to said lowered position, and provides a third voltage less than said second voltage to said stepping motor for holding said conveying mechanism in said raised position.

30. The exchanging apparatus according to claim 29, wherein said driving circuit includes a power shut-off detecting unit for detecting a shut-off of said power source, and
a short-circuiting unit for short-circuiting said portion of said coil of said motor on the basis of a detection signal from said power shut-off detecting unit.

31. The exchanging apparatus according to claim 29, wherein said plurality of recording media are enclosed in said enclosure in a laminated state.

32. The exchanging apparatus according to claim 29, wherein said motor is a stepping motor.

* * * * *